United States Patent
Yoo et al.

(10) Patent No.: US 11,768,157 B2
(45) Date of Patent: *Sep. 26, 2023

(54) LASER ABLATION SPECTROMETRY APPARATUS

(71) Applicant: Applied Spectra, Inc., West Sacramento, CA (US)

(72) Inventors: Jong Hyun Yoo, West Sacramento, CA (US); Chunyi Liu, Fremont, CA (US); Richard E. Russo, Walnut Creek, CA (US)

(73) Assignee: Applied Spectra, Inc., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,083

(22) Filed: Jan. 17, 2023

(65) Prior Publication Data

US 2023/0152236 A1 May 18, 2023

Related U.S. Application Data

(63) Continuation-in-part of application No. 17/929,761, filed on Sep. 6, 2022, now Pat. No. 11,555,786, which is a continuation of application No. 17/366,023, filed on Jul. 2, 2021, now Pat. No. 11,435,290, which is a continuation of application No. 17/073,289, filed on Oct. 16, 2020, now Pat. No. 11,085,882, which is a
(Continued)

(51) Int. Cl.
| | |
|---|---|
| *G01N 21/71* | (2006.01) |
| *B23K 26/04* | (2014.01) |
| *H01J 49/04* | (2006.01) |
| *H01J 49/10* | (2006.01) |
| *H01J 49/00* | (2006.01) |

(52) U.S. Cl.
CPC ......... *G01N 21/718* (2013.01); *B23K 26/048* (2013.01); *H01J 49/0004* (2013.01); *H01J 49/0463* (2013.01); *H01J 49/0468* (2013.01); *H01J 49/105* (2013.01)

(58) Field of Classification Search
CPC . G01N 21/718; B23K 26/048; H01J 49/0004; H01J 49/0463; H01J 49/0468; H01J 49/105
See application file for complete search history.

(56) References Cited

U.S. PATENT DOCUMENTS

2007/0046934 A1* 3/2007 Roy .................. G01J 3/4338
356/318

* cited by examiner

*Primary Examiner* — Jamil Ahmed
(74) *Attorney, Agent, or Firm* — Microtechnology Law & Analysis; Daniel L. Flamm

(57) ABSTRACT

Apparatus for laser induced ablation spectroscopy (LIBS) is disclosed. An apparatus can have a computer, a pulsed laser and a lightguide fiber bundle that is subdivided into branches. One branch can convey a first portion of the light to a first optical spectrometer and a different branch can convey a second portion of the light to another optical spectrometer. The first spectrometer can be relatively wide-band to analyze a relative wide spectral segment and the other spectrometer can be high dispersion to measure minor concentrations. The apparatus can further comprise an unbranched lightguide fiber bundle to provide more light to a low sensitivity spectrometer. The apparatus can include an inductively coupled plasma mass spectrometer ICP-MS and a computer instructions operable to provide normalized LIBS/ICP-MS composition analyses.

16 Claims, 22 Drawing Sheets

Related U.S. Application Data continuation-in-part of application No. 16/293,512, filed on Mar. 5, 2019, now abandoned, which is a continuation of application No. 15/488,422, filed on Apr. 14, 2017, now Pat. No. 10,222,337, which is a continuation-in-part of application No. 15/201,494, filed on Jul. 3, 2016, now Pat. No. 10,393,587, and a continuation-in-part of application No. 13/835,582, filed on Mar. 15, 2013, now abandoned, said application No. 15/201,494 is a continuation of application No. 13/492,923, filed on Jun. 10, 2012, now Pat. No. 9,383,260, said application No. 13/835,582 is a continuation-in-part of application No. PCT/US2011/054994, filed on Oct. 5, 2011, said application No. 13/492,923 is a continuation-in-part of application No. 12/435,970, filed on May 5, 2009, now Pat. No. 8,199,321.

(60) Provisional application No. 62/915,653, filed on Oct. 16, 2019, provisional application No. 61/390,117, filed on Oct. 5, 2010, provisional application No. 61/126,633, filed on May 5, 2008.

| Element | ICP-OES oil | LIBS-Ar aqueous | LIBS-Ar oil (a) | LIBS-N$_2$ oil (b) | LIBS-N$_2$ oil (c) |
|---|---|---|---|---|---|
| Aluminum | 6 | | 0.47 | 0.49 | 1.4 |
| Barium | 0.5 | 1.5 | 1.0 | | |
| Boron | 4 | | 0.44 | | |
| Calcium | 40 | 0.4 | 1.7 | | |
| Chromium | 1 | 5.8 | 0.6 | 0.5 | 1.5 |
| Cobalt | - | 8.8 | | | |
| Copper | 2 | 6.0 | 0.10 | 0.11 | 0.18 |
| Iron | 2 | 14 | 0.94 | 0.52 | 1.2 |
| Lead | 10 | 40 | 7.0 | 10 | 9.6 |
| Lithium | - | 0.2 | 0.04 | 0.01 | 0.1 |
| Magnesium | 5 | 0.16 | 0.03 | 0.02 | 0.04 |
| Manganese | 5 | 2.7 | 0.39 | | |
| Mercury | - | | 10 | | |
| Nickel | 5 | | 1.4 | 1.4 | 1.5 |
| Phosphorus | 10 | | 8 | | |
| Potassium | 40 | 11 | 0.4 | 1.6 | 1.7 |
| Silicon | 8 | | 0.6 | 0.8 | |
| Silver | 0.5 | | 0.37 | 0.2 | |
| Sodium | 7 | 1.6 | 0.36 | 0.2 | 0.2 |
| Strontium | - | 0.44 | | | |
| Tin | 10 | | 2.0 | 3.2 | 3.6 |
| Titanium | 5 | | 0.17 | 0.24 | |
| Vanadium | 1 | | 0.6 | 0.27 | 0.7 |
| Zinc | 60 | 6.2 | 0.31 | | 0.2 |

FIG. 15

| Organic samples | Mg(ppm) | Mg 279.5 nm Avg | Mg 279.5 nm SD | Mg predicted |
|---|---|---|---|---|
| S1 | 1.8 | 102503.3 | 3009.21 | 1.78 |
| S2 | 7.7 | 547195.6 | 12482.83 | 9.75 |
| S3 | 6.1 | 400526.1 | 13162.73 | 7.12 |
| S4 | 6.6 | 443573.8 | 11215.88 | 7.89 |
| S5 | 8.4 | 602147.7 | 16081.67 | 10.73 |

FIG. 20

LASER ABLATION SPECTROMETRY APPARATUS

FIELD OF THE INVENTION

The present disclosure relates generally to the art of chemical analysis, and more particularly relates to improved apparatus and methods for monitoring the composition of a solid and liquid samples using spectroscopies based on laser induced ablation.

BACKGROUND

Elemental composition analysis is essential to determine the safety and quality of products in various industries including petroleum, cosmetics, metallurgy, recycling, mining, pharmaceutical, medical, food industry, and others. However, very few low cost, rapid, reliable, and practical instruments and methods are available to perform elemental composition analysis of samples depending on the requirements and standards of an industry and/or characteristics of samples.

Restriction of hazardous substances by statutes such as the Directive on the Restriction of the Use of Certain Hazardous Substances in Electrical and Electronic Equipment 2002/95/EC (commonly referred to as the Restriction of Hazardous Substances Directive or RoHS) was adopted in February 2003 by the European Union. The state of California has passed a similar law. The directive restricts the use of six hazardous materials in the manufacture of various types of electronic and electrical equipment. The six hazardous materials include Lead (Pb), Mercury (Hg), Cadmium (Cd), Hexavalent chromium (Cr-VI or Cr6+), Polybrominated biphenyls (PBB), and Polybrominated diphenyl ether (PBDE).

Industry seeks efficient and economical measures to comply with RoHS. Dissolution in acid is commonly used to test and measure compositional qualities of sample material. This method has inherent disadvantages. Laser induced breakdown optical emission spectroscopy (LIBS) as well as other laser spectrometry methods are potentially efficient and economical techniques to determining and/or verify the composition of products and other materials.

Analyses using prior art LIBS has often shown excessive variability. A major source of this variability has been inconsistent plasma plume generation by the pulse laser. Former LIBS type analyses have often been unsuccessful in matching known standards achieved with other analysis methods.

Traditional chemical analysis has traditionally been based on various standard methods in which each method was suitable for, or sufficiently sensitive to measure only a relatively small number of elements. General multi-element analysis providing sub-ppm (sub-part-per-million) detection limits for metals can be performed using inductively coupled plasma-optical emission spectrometry (ICP-OES) based ultraviolet spectral region. However, this ICP-OES requires complex sample preparation including acid digestion of samples, as well as sophisticated equipment, fast flow of high-purity argon, quartz/glassware and expensive consumables. The process generates hazardous chemical waste that must be disposed after an ICP measurement. Lengthy sample handling, high power requirements (~3 kW) and large equipment dimensions have impeded the use of ICP-OES for rapid field measurement of species found in petroleum sources. ICP operation has not been adaptable to be performed outside of a laboratory environment.

In principle, LIBS should be applicable to analyze solid/ or liquid, phase material. A commercial LIBS instrument operable to reliably analyze liquids could improve refinery manufacturing by eliminating lag times and improving accuracy in process control and optimization since it can determine both major and minor and trace elements such as occur in petroleum fractions and fuels. With regard to an important need for fuels, LIBS has particular sensitivity to detect and quantify light elements and halogens (e.g. Hydrogen (H), Lithium (Li), Beryllium (Be), Boron (B), Carbon (C), Oxygen (O), Nitrogen (N), Fluorine (F), and Chlorine (Cl) which are difficult or impossible to measure with sufficient sensitivity using conventional and/or more costly instrumental techniques such as ICP. However, with regard to commercial instruments useful for industrial applications, LIBS has only been useful for solid sample analysis despite prior art attempts to develop practical apparatus and methods for liquid phase elemental analysis using LIBS.

The composition of petroleum feedstock, particularly metals content, is a critical factor in deciding how a specific lot of crude oil is used and the specific refining requirements. Various crude oils have very different composition, and these differences critically affect the refining methods that are used to produce fuels and other petroleum and petrochemical products. Crude petroleum contains traces of inorganic salts, nitrogen, oxygen, sulfur, halogens and metals. For example, vanadium (V), nickel (Ni), iron (Fe), and sodium (Na) are often major metallic constituents of crude oil. Other metals can be unintentionally introduced during production, transportation and storage. As well, halide impurities such as salts, when present, can hydrolyze to form highly corrosive acids. Even trace amounts of such elements can impair refining. Refineries may purchase crude oil daily or hourly. An improved ability and speed for detecting these elements at a part-per-million (ppm) sensitivity level using LIBS could improve refinery efficiency and the ability to provide higher quality refinery products.

As well, various contaminants in gasoline must be precisely known since excessive amounts can foul fuel injectors in vehicles and/or deactivate catalytic converters. Fuel analysis must be performed with sub-ppm sensitivity for Copper (Cu), Cadmium (Cd), Zinc (Zn), Iron (Fe), Cobalt (Co), Nickel (Ni), Lead (Pb) and other heavy metals. For example, more than 0.05 ppm of Cu is likely to impair fuel thermal stability.

LIBS analysis of liquid phase samples has been difficult for a number of reasons. Depending somewhat on the sample liquid volatility and surface tension, liquids can adhere to, coat, and/or form droplets attaching to optical and/or other elements of the apparatus. Liquid analysis using LIBS requires a liquid to be rapidly vaporized using one or more laser pulses. However rapid vaporization inherently results in the formation of droplets and/or splashing, depending on the form and confinement of the liquid during the vaporization process. Liquid or liquid droplets reaching optical elements, or liquid vapor condensate on optical elements, can scatter light, disturb optical alignment, transmission, and/or other aspects of light gathering, thereby interfering with light gathering and/or degrading analytical sensitivity and stability. These phenomena have required frequent operator intervention to clean and restore operability of prior art LIBS equipment, making sustained operation difficult and/or impossible. For at least the above reasons, no LIBS instruments and/or methods for analysis of liquid samples have found commercially success.

There has been a long felt need for a single analytical instrument capable of providing rapid and sensitive elemental analysis of both major and trace amounts of light and heavy elements in liquid and solid samples. More particularly, there has been a need for a single, readily transportable analytical instrument with these capabilities in the petroleum, aviation, semiconductor, metallurgy, recycling, mining, pharmaceutical, medical, and food industries. As outlined above, LIBS techniques can provide temporally and spatially resolved analyses of the necessary light and heavy elements. Since a high-power laser source, power supplies, controls systems, optical spectrometers, and specialized detectors used for LIBS are relatively costly, it is apparent that a single instrument capable of analyzing both solid and liquid samples can save cost and relatively enhanced transportability. However, prior art attempts to provide methods and apparatus operable to perform reliable, low maintenance, real-time, automated analysis, of liquids with LIBS, and/or of solid and liquid samples using common components based on a single instrument have been unsuccessful.

SUMMARY

In a first aspect of the present disclosure, a laser ablation spectroscopy apparatus is provided. A pulsed laser is focused on a sample site to generate a plasma plume during a laser ablation process. The plasma plume can be detected with an optical spectrometer having an intensified charge coupled device. A sample of material is coupled to a stage movable in independent x, y and z directions using an array of x-y-z motors. A change in the height of the sample is detected using a sensor. Preferably, the sensor is a triangulation sensor. The apparatus includes a system computer for synchronizing the movement of the stage in the x, y and z direction during the laser ablation process. The height of the sample site can be automatically adjusted following each laser ablation. In one embodiment, the system computer includes a controller, application software and a graphical user interface (GUI).

In another aspect of the present disclosure, a method of laser ablation spectroscopy is provided. The method includes a protocol of generating one or more laser ablations to a sample site. The spectral data of the individual laser ablation sites can be used to form a chemical map of the sample surface or the total number of laser ablations for the sites can be averaged together. In some embodiments, the total number of laser ablations for a sample site equals three laser ablations. The protocol includes laser ablating additional sample sites and averaging the spectral data of the total number of sample sites. In some embodiments, there can be more than 30,000 sample sites.

An innovative aspect of the subject matter described in this disclosure is an implementation of a laser induced breakdown spectroscopy apparatus for liquid and solid samples that provide quantitative data with high accuracy, sensitivity and reproducibility. Furthermore, the disclosed LIBS apparatus can be designed as a compact and portable single instrument comprising modular units effectuating measurement and detection of trace elements along with minor and major elemental composition of any liquid and/or solid samples. Another embodiment is a single LIBS instrument capable of measuring every element of the Periodic chart that has a known optical spectrum simultaneously.

The present disclosure provides a novel apparatus for performing rapid chemical analysis of liquid samples using laser induced breakdown spectroscopy (LIBS). The apparatus includes a pulsed laser, a pump to introduce liquid sample material, a nebulizer to generate an aerosolized portion of the liquid, means to confine and/or control a flow pattern of the gaseous aerosol, and means to exhaust and/or collect the aerosol. The apparatus also comprises an optical system that can steer and/or focus a laser beam to a predetermined location in the aerosol flow to produce an emissive plasma plume comprising the aerosolized sample material. There is also an optical system that can gather a portion of the characteristic light emitted from the plume and couple said light into one of more spectrometers having respective detectors. A predetermined combination of a spectrometer comprising a wavelength separating element and a detector are configured to measure spectral data and generate intensity values, wavelength values and composition values of one or more elements of the sample optimally. The spectrometer can have a scanning single channel configuration, a cross-dispersion echelle configuration, or a multi-channel configuration of several spectrometers. The detector can be a high speed triggered/gated detector (e.g. charge coupled device "CCD" or complementary metal oxide silicon "CMOS" camera), a high-speed intensified detector (e.g. intensified charge coupled device "ICCD"), an electron multiplying charge coupled device (EMCCD), or an array of photodiodes or photomultipliers. A predetermined instrument configuration suitable for analysis of both liquid and solid samples can have a single wavelength separation element and detector array (a spectrometer) or use respectively separate and/or different spectrometers for liquid and solid analyses, depending on the application.

Another aspect of the present disclosure includes a novel method of measuring major, minor and trace elements in liquid samples using the LIBS apparatus. The method includes generating a narrow stream of aerosol from a portion of a liquid sample which is carried by a flow of a carrier gas such as air, nitrogen and/or any inert gas selected based on the characteristics of the sample and the types of elements being detected. A laser beam with a preselected power, frequency, and duration, and wavelength values is directed to and focused on a preselected region of the aerosol stream, which generates a luminous plasma plume comprising an atomized, partially ionized, and optically excited molecular species of the sample material. The emission spectra from the aerosolized sample material is recorded by a device preferably an optical spectrometer including an ICCD, EMCCD, CMOS or CCD detector(s) which digitizes the spectral data for further computational analysis in real time. The optical spectrum provides a signature of the chemical species present in the sample. Then the concentrations of one or more specific chemical species in the sample are quantified using previously known standard reference spectra.

Extremely viscous liquids and/or fluids that cannot be aerosolized can be analyzed within a time scale during which they are substantially equivalent to solid samples. It has been found that sufficiently high viscosity materials do not splash during laser ablation. These materials can be analyzed is the same manner as "solids". In practice, depending on the viscosity, it may be convenient or necessary to put the highly viscous material in a small containers such as a beaker, or other container that can in turn be on the solid sample stage within the LIBS apparatus. Venezuelan crude oil such as the NIST research material RM-8505 is an example of a viscous material that can be measured as if it were a solid sample, thus requiring no sample preparation (e.g. dissolving and/or diluting of viscous sample materials). It was observed that laser ablation events produce voids (e.g. "craters") on the surface of Venezuelan crude oil in a container. Such craters persist longer than 30 seconds before the surface of the viscous crude is restored by gravity and surface tension.

The present disclosure also includes various embodiments for performing rapid chemical imaging of any solid samples in 2D and 3D using the LIBS described herein. The embodiments provide a 2D and/or 3D elemental composition of a solid sample by mapping and effectuating LIBS analysis of a series of preselected sample sites in x, y and z axes, quantifying and compiling these chemical composition data. The solid samples are placed in a chamber operable to move in x, y and z axes independently using translation motors. The sample chamber is built with a transparent window through which a collimated laser beam passes to ablate a preselected specific site of the sample. A compact CMOS camera provides magnified images of the sample surface for visual inspection, monitoring and controlling the movement of the sample. Furthermore a triangulation sensor detects and measures exact position of the sample surface. Using the signal from the triangulation sensor, an ablating laser beam can be focused on a preselected sample site on the sample surface automatically. The sample surface can be flat and/or curved. The sample chamber has an inlet and outlet openings allowing the flow of an unreactive carrier gas such as Nitrogen ($N_2$), Argon (Ar), Helium (He), and/or air through. The preselected gas carrier gas flow rate is controlled preferably by a mass flow controller. The apparatus includes a system computer with operation software that controls all working functions of the instrument and through which a preselected protocol depending on the application can be entered and executed to generate a 3D chemical imaging of a solid sample.

The present disclosure also compromises a novel method for detecting and measuring major, minor and trace elements in solid samples with high spatial resolution in 2D and/or 3D using the LIBS described herein. The method includes a protocol of generating on a sample site at least one laser ablation or a series of ablations in a predetermined pattern, for example a grid of sample sites on the surface of a solid sample and at a specific depth of a sample sensed by a triangulation sensor. The spectral data of the individual laser ablation events can be used to form a chemical image of the sample and/or the spectra from any number of laser ablations can be summed up together for averaging depending on the structure and the material of the sample. Lateral resolution of the resulting chemical image is determined by a preselected ablation spot size and a pattern used. Depth resolution is determined by preselected energy of laser pulses and a sample material. In some embodiments, there can be more than 10000 sample ablation events to construct such as a chemical image of a solid sample.

Further aspects of the present disclosure include novel methods for measuring elemental composition of samples which are significantly smaller than a laser spot size on the sample site, particularly analysis of samples with sub-micron (<1 mm) sizes and sub-nanogram (<1 ng) masses. Examples of such samples can include individual solid particles on a substrate such as filter paper, swipes, adhesive tape, or other surfaces. The sample can be prepared by embedding of the minute sample in ice and/or other types of matrix materials to detect specific individual particles using high spatial resolution LIBS. Additionally, biological tissue samples can be prepared by administration of nanoparticles-based biomarkers and the distribution and interaction of the biomarker in the tissue can be analyzed using LIBS precisely. The disclosed method includes means of navigating through an embedded sample surface images to place an inspected particle into a laser spot, and obliterating the whole particle located in a laser spot with a single laser pulse to obtain a spectrum corresponding to the select particle. Sensitivity of this method meets that of ICP-MS, which can measure only average elemental concentrations of all particles from an acid-digested macroscopic sample.

Further embodiments included in the present disclosure are the capabilities of LIBS fully automated mode of all operations and the real time computational analysis of digital spectral data to identify at least partially chemical composition and characterize the elemental composition of a plurality of sample forms. The computational methods enabling real time analysis of elemental composition include quantifying the elements according to the known spectral standards, and performing explorative (visualization), qualitative (classification), or quantitative (calibration) statistical analysis. One protocol to quantify emission spectra data includes univariate calibration using standard reference materials and/or the calibration standards directly added to the aliquots of analyzed sample (standard additions) depending on the applications. The spectral analysis protocol is performed using statistical analysis methods often referred to as "chemometric analysis" or "chemometrics". The chemometric algorithms are operable to compare a real-time measured spectrum to the spectra stored in a reference database in memory of a system computer. This method allows users to detect, identify, and quantify chemical elements present in a sample using an automated mode of operation. Accordingly, simplified operation showing symbolic red, amber or green "lights" can be realized for rapid monitoring or quality control of the samples. Alternatively, all generated and calibrated spectral data, and/or elemental concentrations can be presented on a graphical user interface.

Some embodiments include a true universal LIBS analyzer that can measure the elemental composition, major, minor and trace elements in any solid or liquid sample. The disclosed apparatus requires only about 750 µl of a liquid sample, or only a few nanogram of solid sample, consumes only low power (<400 W) and generates no acidic waste. The capability of LIBS to measure major elements within most materials, particularly of organic materials comprising Carbon (C), Hydrogen (H), Oxygen (O), and/or Nitrogen (N) facilitates normalization and correction of signals from the trace elements on the distribution of major matrix elements to improve accuracy and precision of quantitative analysis. This is especially important for heterogeneous matrices and matrices of variable density, such as biological matrices.

Other features will become apparent from consideration of the following description taken in conjunction with the accompanying drawings.

BRIEF DESCRIPTION OF DRAWINGS

Various embodiments are illustrated in an exemplary manner by the accompanying drawings. The drawings and accompanying description should be understood to explain principles of the embodiments rather than be limiting. Other embodiments will become apparent from the description and the drawings:

FIG. 15 shows lower limits of detection for elements in aqueous or nonaqueous solutions in an ICP-OES analysis and using an embodiment of the disclosed LIBS apparatus.

FIG. 20 presents the LIBS and ICP-OES measurements of Mg in low-viscosity nutrient liquid samples in an embodiment.

DETAILED DESCRIPTION

Figure 1:
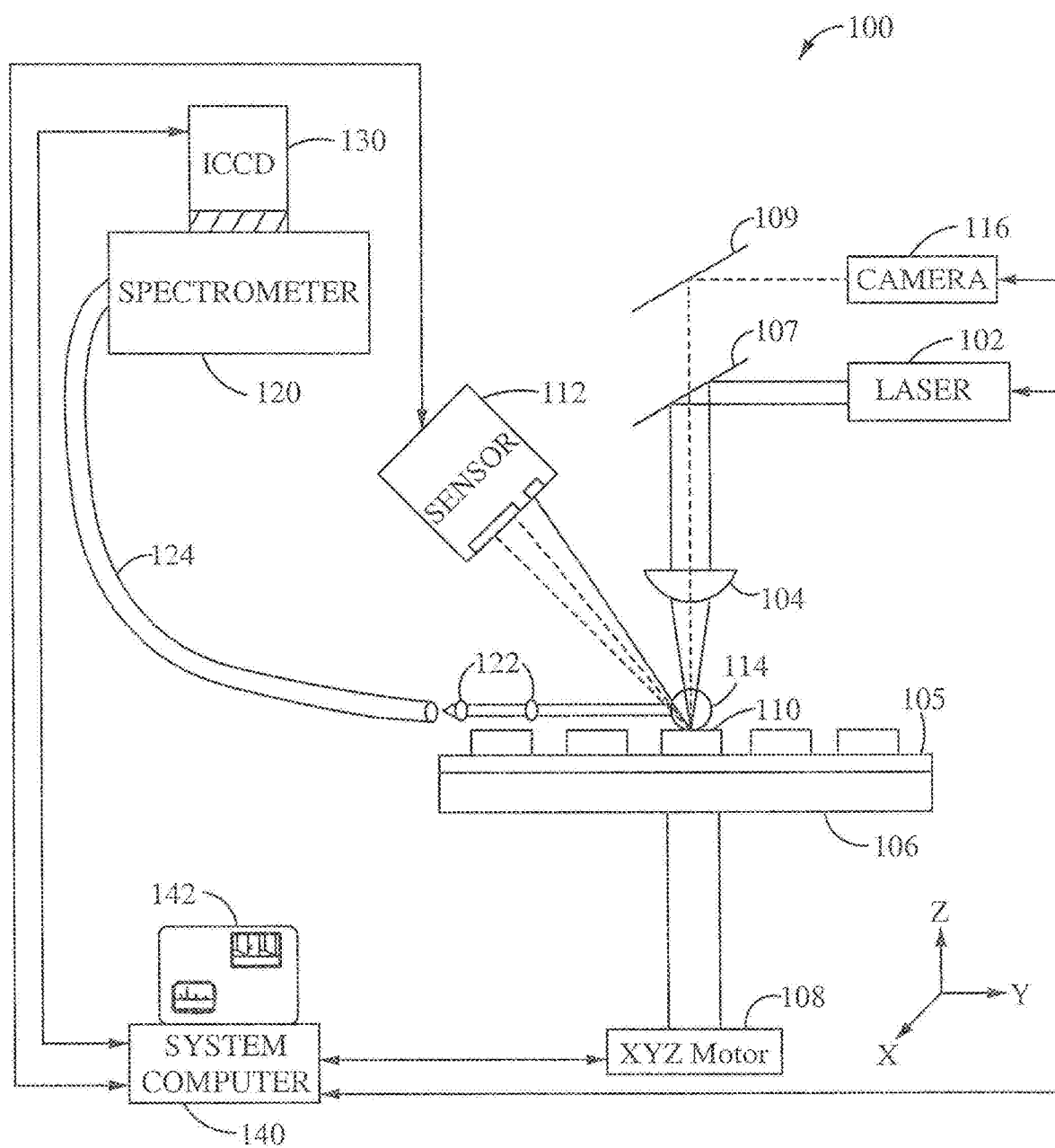
FIG. 1 is a simplified diagram of a laser ablation apparatus embodiment.

Systems, methods, compositions, and apparatus for providing novel laser induced ablation spectroscopy are disclosed. In various embodiments, an apparatus comprises a sample site position sensor, stage position motors operable to move the stage in three independent spatial coordinate directions, and a stage position control circuit to move an analysis sample site to selected coordinate positions for laser ablation, with no human interaction. The ablation of material from an analysis sample site can displace its position from a point where the laser beam has a predetermined spot size. The embodiments can have a laser position sensor to detect a change in the position of the sample site and generate a displacement signal operable for the stage position control circuit to return the sample site to an original position using the stage motors.

In various embodiments, collection optics can be useful to gather light from a plasma plume produced with a laser ablation. The collection optics can couple the gathered light into a light receiving end of a lightguide through which the light can be transmitted to a spectrometer. The lightguide can be a single fiber optic bundle including a plurality of optical fibers held generally parallel to one another in a geometric arrangement. However, in some embodiments, the various fibers in the single bundle (trunk section) at the (light receiving) end can be advantageously subdivided into smaller bundles (e.g. a plurality of branches) to convey various portions of the light to a plurality of spectrometers. Depending on the application, different branches can convey distinct preselected fractions of the light from the trunk to different spectrometers. For example, in an embodiment one branch from the trunk fiber bundle can convey a first portion of the light to a broadband spectrometer operable to analyze a relatively wide spectral segment, and a different branch can convey a second portion of the light to a high dispersion spectrometer operable to measure minor concentrations and/or trace elements. Emissions from a plasma plume can thereby be simultaneously analyzed in various ways using spectrometers having distinct and/or complementary capabilities. For example, a spectrometer having a high speed gated detector, a spectrometer having a high speed intensified detector (i.e. an ICCD), a spectrometer having an electron multiplying charge coupled device (EMCCD), and/or a spectrometer having enhanced sensitivity and/or selectivity in particular wavelength regions and or at particular wavelengths, can all receive and analyze radiation from the same plasma plume carried through different branches. It will be understood that various advantageous spectrometer characteristics may not be exclusive. For example, a spectrometer can be configured with a type of detector particularly well suited to the characteristic light throughput (efficiency) and resolution of its dispersive element(s), as well as being selectively gateable to detect light exclusively in a preselected interval following each laser pulse. In particular, an intensified charge coupled device detector can be intensified to provide very high sensitivity relative sensitivity, and/or can be synchronously gated on during a short interval following each laser pulse to discriminate against background continuum radiation.

The terminology herein is for the purpose of describing particular embodiments and is not intended to be limiting of the invention. It will be understood that, although the terms first, second, etc. may be used to describe various elements, these terms are only used to distinguish one element from another, and the elements should not be limited by these terms. For example, a first element could be termed a second element, and similarly a second element could be termed a first element, without departing from the scope of the instant description. As used herein, the singular forms "a", "an" and "the" are intended to include the plural forms as well, unless the context clearly indicates otherwise. It will be further understood that the terms "comprises," "comprising," "includes," "including," and/or "having," as used herein, are open-ended terms of art that signify the presence of stated features, integers, steps, operations, elements, and/or components, but do not preclude the presence or addition of one or more other features, integers, steps, operations, elements, components, and/or groups thereof. Reference in the specification to "one embodiment", "an embodiment", or some embodiment, etc. means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments.

As used here, various terms denoting spatial position such as above, below, upper, lower, leftmost, rightmost and the like are to be understood in a relative sense. The various aspects of the apparatuses described herein are operable without regard to the spatial orientation of the apparatuses as a whole. For example, an apparatus can be configured in a vertical orientation or in a horizontal orientation. Hence a component or module that is described as being above another component or module in a first embodiment having a first orientation, could equivalently be described as being to the left of the other component or module in an equivalent second embodiment configured to be in a second orientation 90 degrees counterclockwise with respect to the first.

The term module refers to a distinct unit that is operable to perform an identifiable function. A module can be a self-contained physical unit or piece of equipment. A module can also be a logical component effectuated by a processor and tangible media having instructions and/or data that are operable for the processor to perform the identifiable function. The term automatic refers to a module, service, or control system that is operable to perform with no human interaction. Monitoring or sensing refers to measuring a physical quantity. Monitoring is often performed for the purpose of regulation or control.

The term gas or gas phase species as used herein includes species not bound to each other that have thermal and/or directed motion in a gas phase. The term is not limited by a specific value of a mean free path between collisions. Hence the term "gas phase species" includes various different species in vapors, atomic or molecular beams, and gaseous suspensions such as aerosols, and the like.

A lightguide refers to a transmission channel for the directed transmission of luminous electromagnetic radiation over a distance. A lightguide can include one or more fine filamentary optical fibers comprised of dielectric material such as silicon dioxide, a transparent polymer, and the like. The outer surface of each individual optical fiber can have a cladding of relatively lower refractive index. A lightguide have a cross section that is circular, rectangular, U-shaped, ribbon-shaped, and others. The cross section can be solid or it can be hollow. By way of further example, a lightguide can be covered with a jacket comprised of transparent material, opaque material, and others.

The term spectrometer is generally used to identify an instrument that can used to view and/or analyze a characteristic of a substance. With reference to LIBS, an optical spectrometer (also referenced as "spectrometer" and/or "spectrograph") is an instrument operable to separate and detect different wavelength components in electromagnetic radiation within a range of about 180 nm to 1000 nm (ultraviolet to infrared). However, depending on the context, the term optical spectrometer ("spectrometer") can also be understood to mean the subsystem in an optical spectrometer operable to disperse and/or separate various wavelength components of the electromagnetic radiation (e.g. the term spectrometer being understood to mean a monochromator or polychromator apart from any detector). The intended meaning can be understood from the context.

The term "detector", as used here, means a plurality of elemental electromagnetic radiation sensors in an array. The array can be a linear array or a two dimensional array of electromagnetic radiation sensors. Linear and two dimensional arrays of CMOS (complementary metal oxide semiconductor) photosensors, CCD (charge coupled device) photosensors, ICCD (intensified charge coupled device) photosensors, EMCCD (electron multiplying CCD) photosensors, and one and two dimensional arrangements of multiple photodiodes, photomultipliers, and others can be useful detector arrays ("detectors") for LIBS, depending on the embodiment. The terms photosensor and photodetector, as used here, are synonymous.

The term a mass spectrometer (MS), as used herein, references an instrument that can separate and detect ions gas based on their charge to mass ratio. The term inductively coupled plasma mass spectrometer (ICP-MS) will be understood to mean an analysis instrument based on ionizing gaseous species in a high temperature inductively coupled (thermal) plasma, extracting such ionized species from the plasma, and determining their composition with a mass spectrometer.

The present teachings may be embodied in various different forms. In the following description, for purposes of explanation, numerous specific details are set forth in the description and drawings in order to provide a thorough understanding of the various principles. Furthermore, in various instances, structures and devices are described and/or drawn in simplified and/or block diagram form in order to avoid obscuring the concepts. However, it will be apparent to one skilled in the art that the principles can be practiced in various different forms without these specific details. Hence aspects of the invention should not be construed as being limited to the embodiments set forth herein.

FIG. 1 shows a schematic overview of a laser ablation apparatus 100 according to the present invention. The apparatus 100 generally includes a pulse laser 102, a stage 106, a position sensor 112, a spectrometer 120 and a system computer 140. The apparatus 100 is configured to generate laser pulses from the pulse laser 102. The laser pulses are focused onto a sample 105 with a lens 104 to produce a plasma plume 114 of the sample 105 at a sample site 110. The position sensor 112 is electrically coupled with the system computer 140 for sending a displacement error signal to automatically correct positioning of the stage 106 during an ablating process as describe further below. The apparatus 100 can include a system frame for housing the various components described herein. The system frame can include an air filter for filtering contaminants produced during the ablating process.

The pulse laser 102 in an exemplary embodiment comprises a neodymium doped yttrium aluminum garnet (Nd:YAG) laser for generating energy in the near infrared region of the electromagnetic spectrum with a wavelength of 1064 nm. The pulse duration can be approximately 4 ns for generating a laser beam with a power density that can exceed one $GW/cm^2$ at a focal point or ablation impact point. The laser 102 can have a repetition rate of approximately 10 hz or alternately lower than 10 hz in some embodiments. Alternatively, the pulse duration can vary to tens or hundreds of nanoseconds. In another embodiment, the pulse duration can be shortened to ultra short femtoseconds. The lens 104 comprises an objective lens used to focus the laser beam on a surface of the sample site 110. The laser beam can be focused to a spot size of approximately 10-500 micrometers on the sample site 110. In an exemplary embodiment, the laser beam can be focused to a spot size of approximately 150-200 micrometers on the sample site 110.

In an alternative embodiment, a spark generator can be used as the ablation source instead of the pulse laser 102 or a spark can be synchronized and used in combination with the laser pulse. An electric spark is passed through a sample material until the sample material reaches a temperature where characteristic spectral emissions can be detected. In an exemplary embodiment, the electric spark can be controlled in an argon atmosphere. A person of ordinary skill in the art can appreciate the construction of such spark generators in spark spectroscopy systems.

A dichroic mirror 107 is used for directing the laser beam toward the sample site 110 and a mirror 109 allows viewing of the sample site 110 using a video camera 116.

The stage 106 includes an attached array of 'x-y-z' motors 108 for providing translation of the stage 106 in a three dimensional space. The x-y-z motors can comprise suitable stepper motors driven by stepping motor controllers (not shown), as known by a person of skill in the art. In one embodiment, the stage 106 can have a translation rate of approximately 10 cm/s. The stage 106 can include a sample securing means.

Figure 1A:
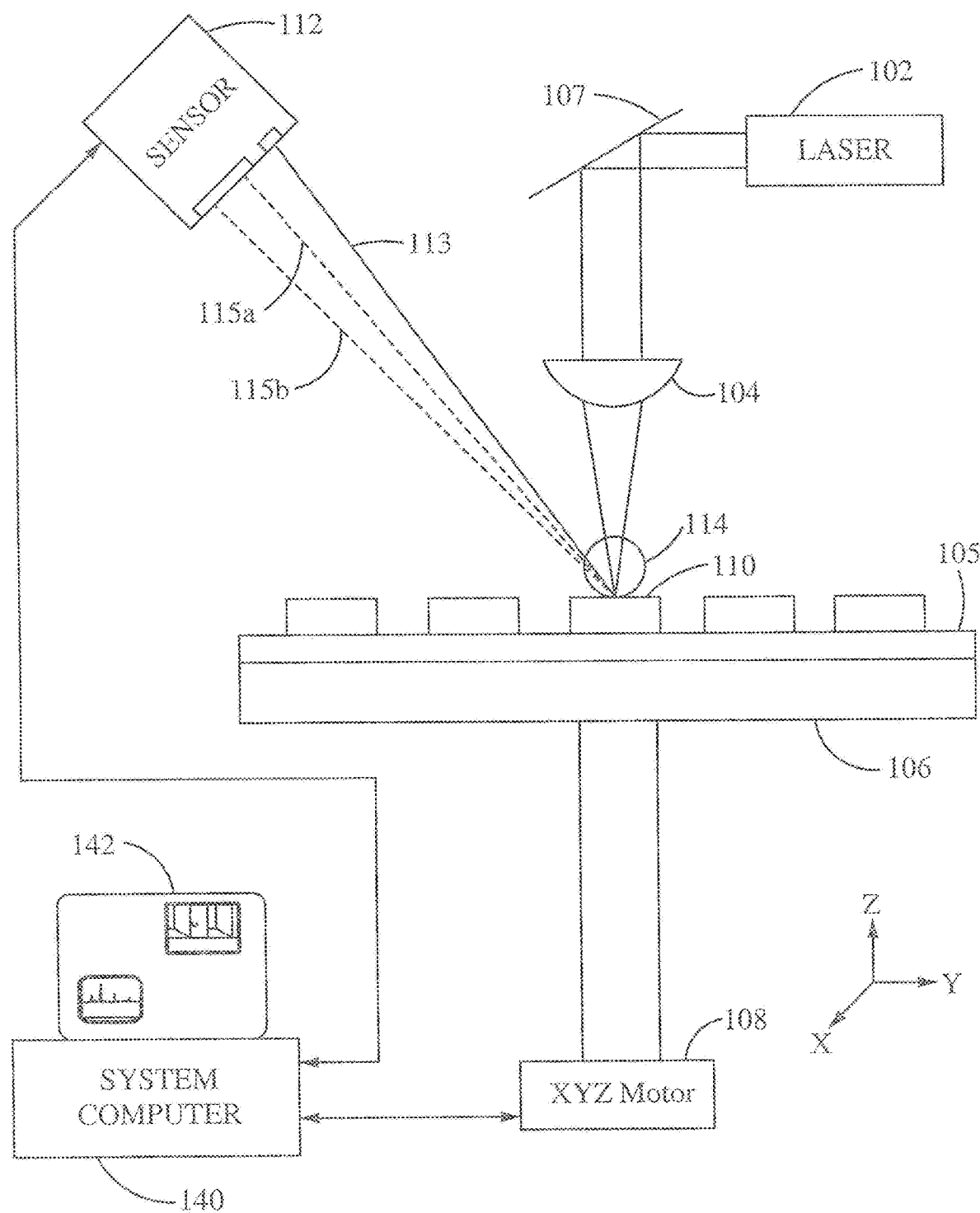
FIG. 1A is another diagram of a laser ablation apparatus embodiment.

The position sensor 112 preferably comprises a laser triangulation sensor. The position sensor 112 preferably uses the principle of triangulation to determine changes in height of the stage 106 and the associated sample 105. As shown in greater detail in FIG. 1A, triangulation occurs when the position sensor 112 emits a triangulation laser beam 113 that is focused on the sample site and a first reflection 115*a* is sensed by a photodetector within the position sensor 112. A change in height of the sample site 110 causes a displacement in the triangulation laser beam 113 to produce a second reflection 115*b* and a displacement signal generated by the position sensor 112 is communicated to a system computer 140. The system computer 140 provides positioning information to maintain an optimum height of the sample site. The position sensor 112 can comprise a suitable laser displacement measuring device as known to a person of skill in the art. In one embodiment, the triangulation laser 113 coincides with a spot circle of the laser 102 generated at the sample site. The triangulation laser 113 can also be used as a targeting marker when selecting a specific point on the sample site 110 as seen with the video camera 116 as the triangulation laser 113 can produce a visible spot on the surface of the sample site 110.

The spectrometer 120 (FIG. 1) collects electromagnetic information from the plasma plume 114. The spectrometer 120 can be a monochromator or a polychromator with a detector. The electromagnetic information includes spectral information identifying an elemental composition of the sample site 110. A spectral range for the spectrometer 120 can be chosen to suit different applications. In an exemplary embodiment the spectral range can be approximately 35 nm for observing a portion of the electromagnetic wavelength range. Alternatively, the spectrometer 120 can detect electromagnetic radiation in a range of 200 to 900 nm. Collection optics 122 receive light and plasma lumina generated from the plasma plume 114 and transmits the light and plasma lumina through a fiber cable 124 to the spectrometer 120. The collection optics 122 can be orientated horizontally as shown in FIG. 1. Alternatively, the collection optics 122 can be orientated at any angle above the sample 105 surface plane. A mirror (not shown) within the spectrometer 120 reflects the plasma lumina to a grating that disperses the plasma lumina.

An intensified charge coupled device (ICCD) or detector 130 is coupled with the spectrometer 120 for detecting the dispersed plasma lumina. The detector 130 provides the detected plasma lumina to the system computer 142. The system computer 140 generates spectral information from the plasma lumina of the laser plume 114. The spectral information includes intensity data representing elemental information and composition of the sample site 110. The spectral information can be produced on a display 142.

The detector 130 provides increased resolution and greater selectivity of the spectral information. The detector 130 includes a microchannel image intensifier plate. The intensifier plate is preferably gated during period of time when the plasma plume 114 emits characteristic atomic emission lines of the elements. This period coincides with an optimum plume luminance period. This period follows emission of continuum radiation. Continuum radiation lacks useful specific species or elemental information. In one embodiment, a delay generator (not shown) can be included to provided gating of the detector 130 to allow temporal resolution of the detector 130 response time. Alternative embodiments of the detector 130 can include a detector other than an ICCD, for example a suitable charge coupled device (CCD) or suitable photomultiplier. Accuracy of the spectrometer 120 and detector 130 in one embodiment can generate compositional data in the range of 20 ppm or less. Alternatively, the accuracy can be in the range of a few %. In another embodiment, the accuracy can be in the range of 1%, which is approximately 10,000 ppm.

The system computer 140 can include application software and a controller in the system computer 140 for providing synchronization of the laser 102, spectrometer 120, detector 130, position sensor 112 and the x-y-z motors 108 positioning of the stage 106. The system computer 140 is electrically coupled with the laser 102, spectrometer 120, detector 130, position sensor 112, the x-y-z motors 108 and the camera 116. The system computer 140 includes a display 142 for displaying spectral information. The system computer 140 can present the spectral data generated on the display 142. Alternatively, a separate personal computer can also be coupled with the system computer 140 for separately analyzing the spectral information. The system computer 140 can include a power controller to regulate power to all the apparatus 100 components.

The application software decodes the spectral information from the detector 130 and facilitates analysis of the spectral information and generates composition information of the sample 105. In one embodiment, the intensity data of an elemental peak is subtracted from background data of the elemental peak to calculate a change in intensity (delta I). The application software allows setting of certain parameters for performing the laser ablations of the sample site 110. A laser spot circle size can be set as a parameter and can be consistently and precisely maintained through the laser ablation process described in further detail below. Alternatively, a z value for the sample site 110 can be set as a parameter and can be consistently and precisely maintained through the laser ablation process. The spot circle increases or decreases depending on the change in height of the sample site 110. Keeping the laser 102 spot circle precisely adjusted insures that the sample site 110 produces the plasma plume 114 with consistent optimum plume luminance. Height changes in the sample site can be detected by the position sensor 112 and a correction to the height of the sample site 110 is generated by the controller within the system computer 140. The application software and the controller generate correction signals to reposition the height of the stage 105 after each laser ablation of the sample site.

Figure 2:
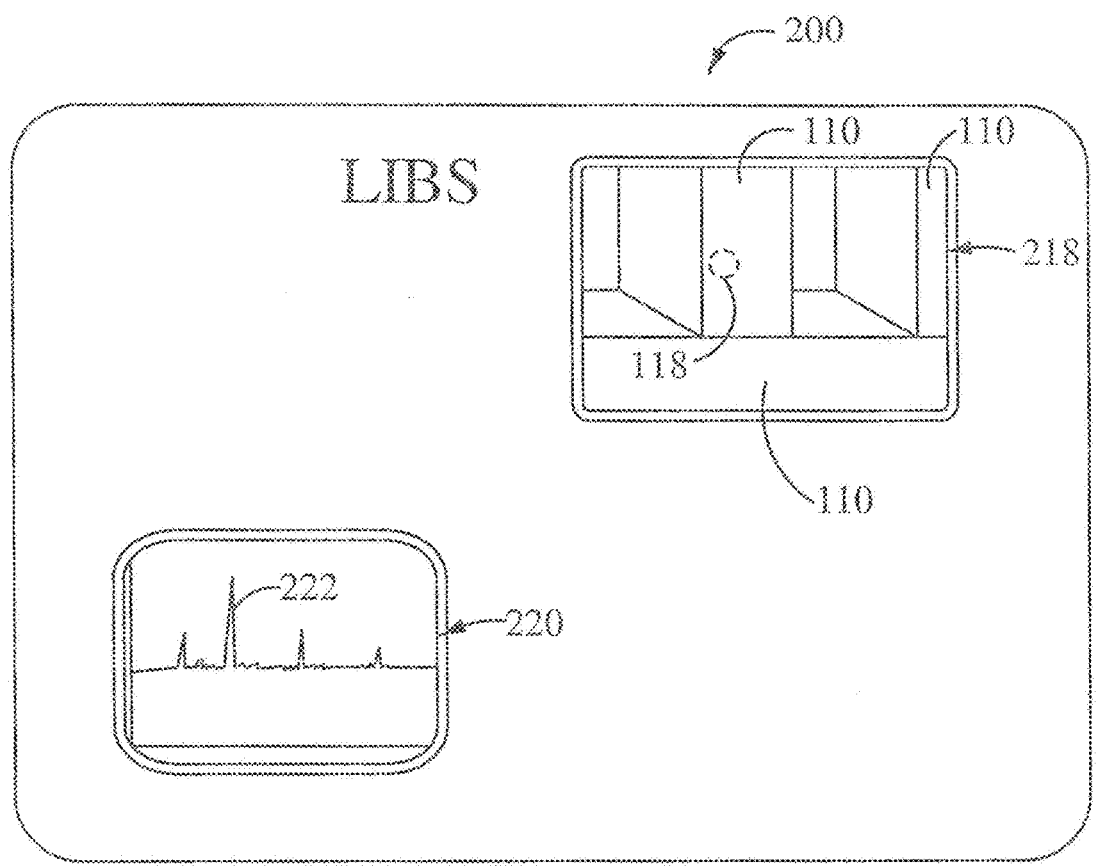
FIG. 2 illustrates a detail of a laser ablation graphical user interface.

FIG. 2 shows a representative graphical user interface (GUI) 200 according to an embodiment of the present invention. The GUI 200 includes a first data window 218 and a second data window 220. The first data window 218 provides real-time video of a sample site 110. A spot circle 118 can be observed on the sample site 110 during and following an ablation. The second data window 220 provides spectral information generated from the system computer 140. In an exemplary embodiment, the spectral information includes a waveform 222 representing intensity and wavelength data of a sample site ablation.

Figure 3:
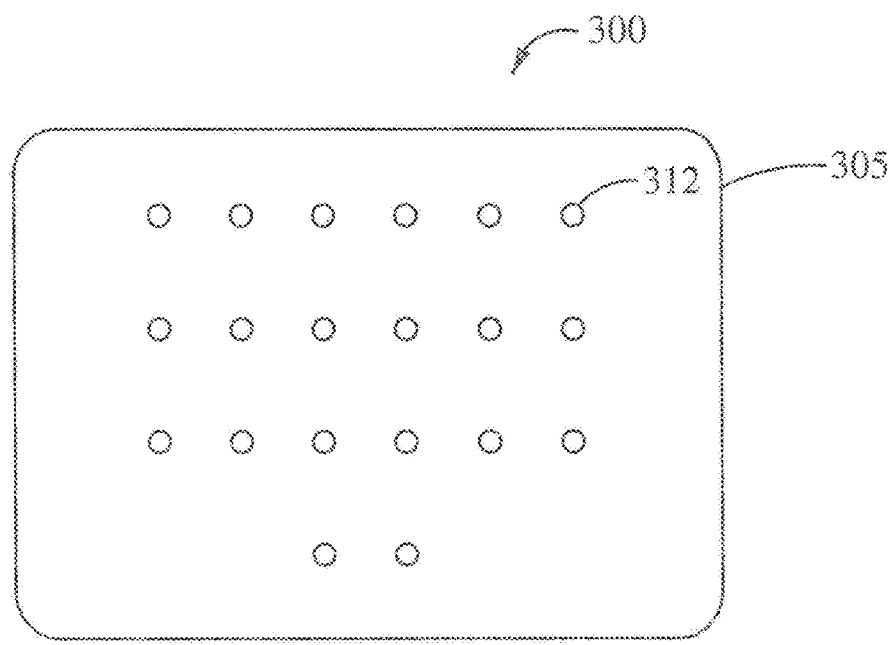
FIG. 3 illustrates a plan view of a testing protocol.

FIG. 3 shows a top view 300 of a protocol for ablating a sample 305 according to an embodiment of the present invention. The protocol includes ablating multiple sample sites 312. In an exemplary embodiment, the sample sites can be uniformly and evenly distributed throughout a surface of the sample 305. Alternatively, the sample sites 312 can be randomly distributed through the surface of the sample site. The number of sample sites 312 ablated can vary depending on a particular sample or a particular application. The spectral data of the individual laser ablation sites can be used to form a chemical map of the sample surface or the total number of laser ablations for the sites can be averaged together. In one embodiment, the number of sample sites comprises twenty. Alternatively, the number of sample sites can be ten or fewer. In another embodiment, the number of sample sites can be thirty or more.

The protocol 300 can include a specific number of pulse laser ablations per sample site 312. Heterogeneous material can include elements having varying thermal properties. A single shot laser ablation can vaporize disproportionately more volatile elements than the less volatile elements. Spectral information from a single ablation may not be a reliable indication of the composition of the sample 305. In an exemplary embodiment, the number of laser ablations per site comprises three laser ablations. Alternatively, the number of laser ablations per site comprises two. In another embodiment, the number of laser ablations per site comprises a single laser ablation. In still another embodiment, the number of laser ablations per site comprises four or more laser ablations.

Figure 4A:
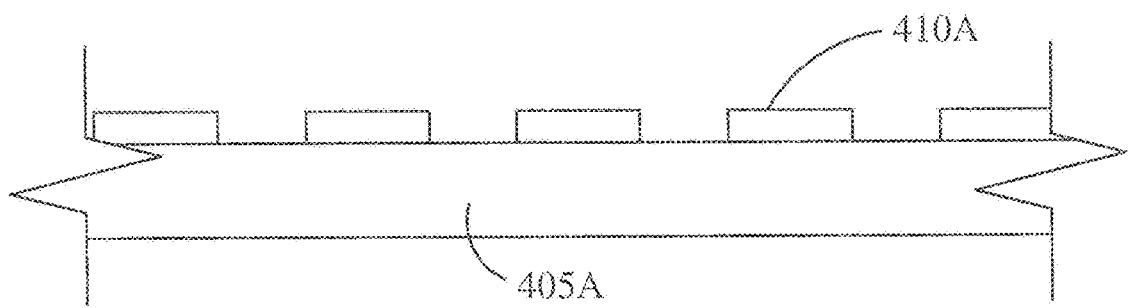
FIGS. 4A and 4B illustrate side views of a topology of a sample according to an embodiment.
Figure 4B:
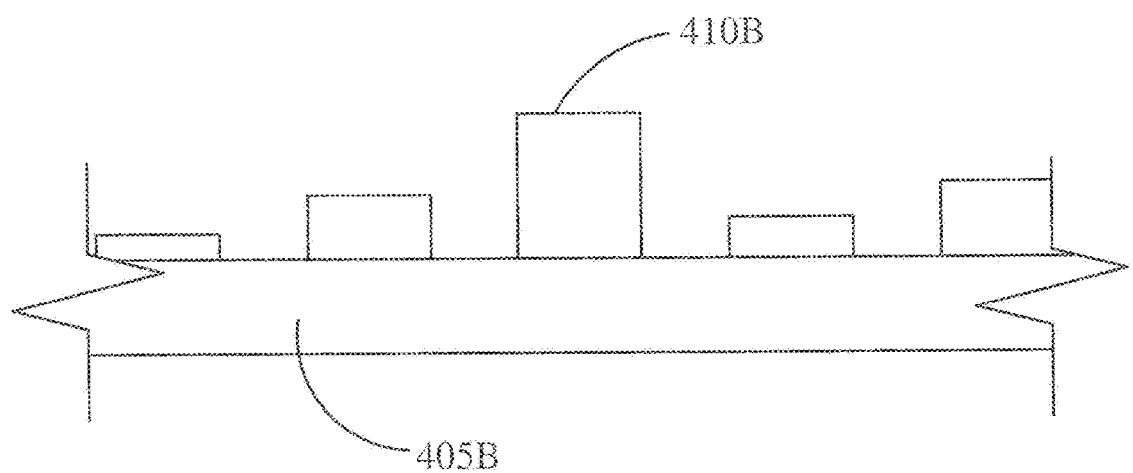

FIGS. 4A and 4B show side views of a first sample 405A and a second sample 405B according to an embodiment of the present invention. The first sample 405A comprises a material having sample sites 410A with substantially uniform topology. The height of the sample sites 410A are substantially the same. The second sample 405B, however, comprises a material having sample sites 410B with erratic or varying topology. The height of the sample sites 410B can be different. The apparatus 100 is configured to provide consistent spectral data for either the uniform sample sites 410A or sample sites 410B with varying heights. The system computer 140 adjusts the height of the stage 106 to achieve the optimal plasma lumina.

Figure 5:
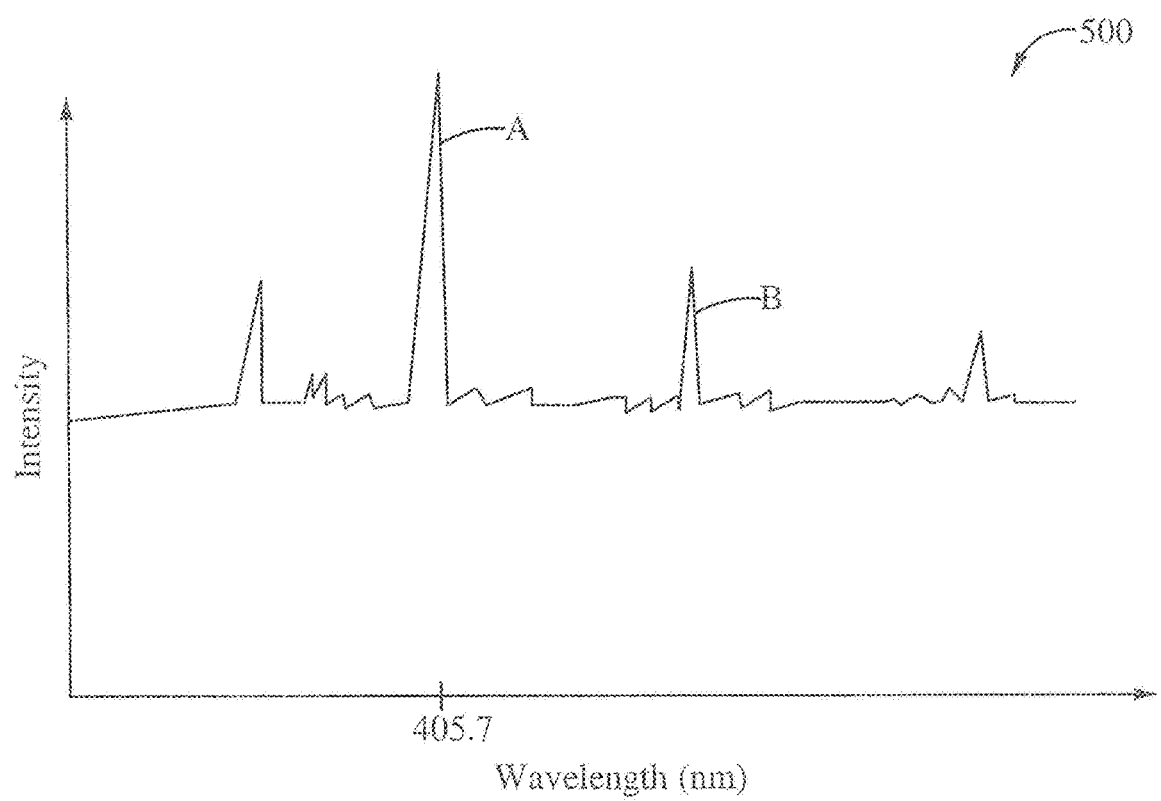
FIG. 5 illustrates a plot of spectral information according to an embodiment.

FIG. 5 shows a plot 500 of spectral data according to an embodiment of the present invention. The plot 500 includes a waveform plotted along a wavelength (nm) versus an intensity (a.u.). An elemental peak 'A' can represent the spectral information for the element Lead (Pb). The elemental peak 'B' can represent spectral information of a different element.

Figure 6:
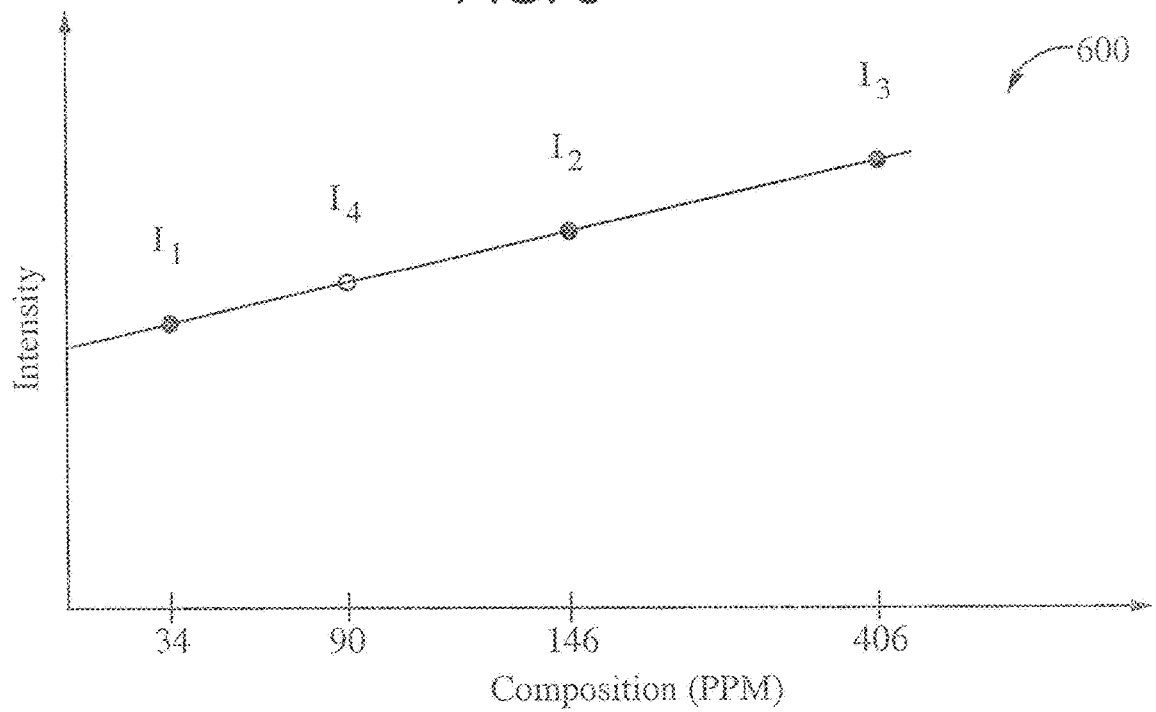
FIG. 6 illustrates a plot of intensities of known standards according to an embodiment.

FIG. 6 shows a plot 600 of compositional data 600 according to an embodiment of the present invention. The plot 600 includes a waveform plotted along a composition (nm) versus an intensity (a.u.). The plot 600 is generated by performing laser ablation according to the method described herein on a known standard sample. The known standard produces intensities I1, I2 and I3 for associated elements at the respective compositions 34 ppm, 146 ppm and 406 ppm. Quantitative analysis of different elements of a particular sample is performed by comparing spectral data of the particular sample with the compositional data 600. For example, spectral information obtained from analysis with the apparatus 100 can include intensity 14. The quantity of the element can be approximated to 90 ppm.

Figure 7:
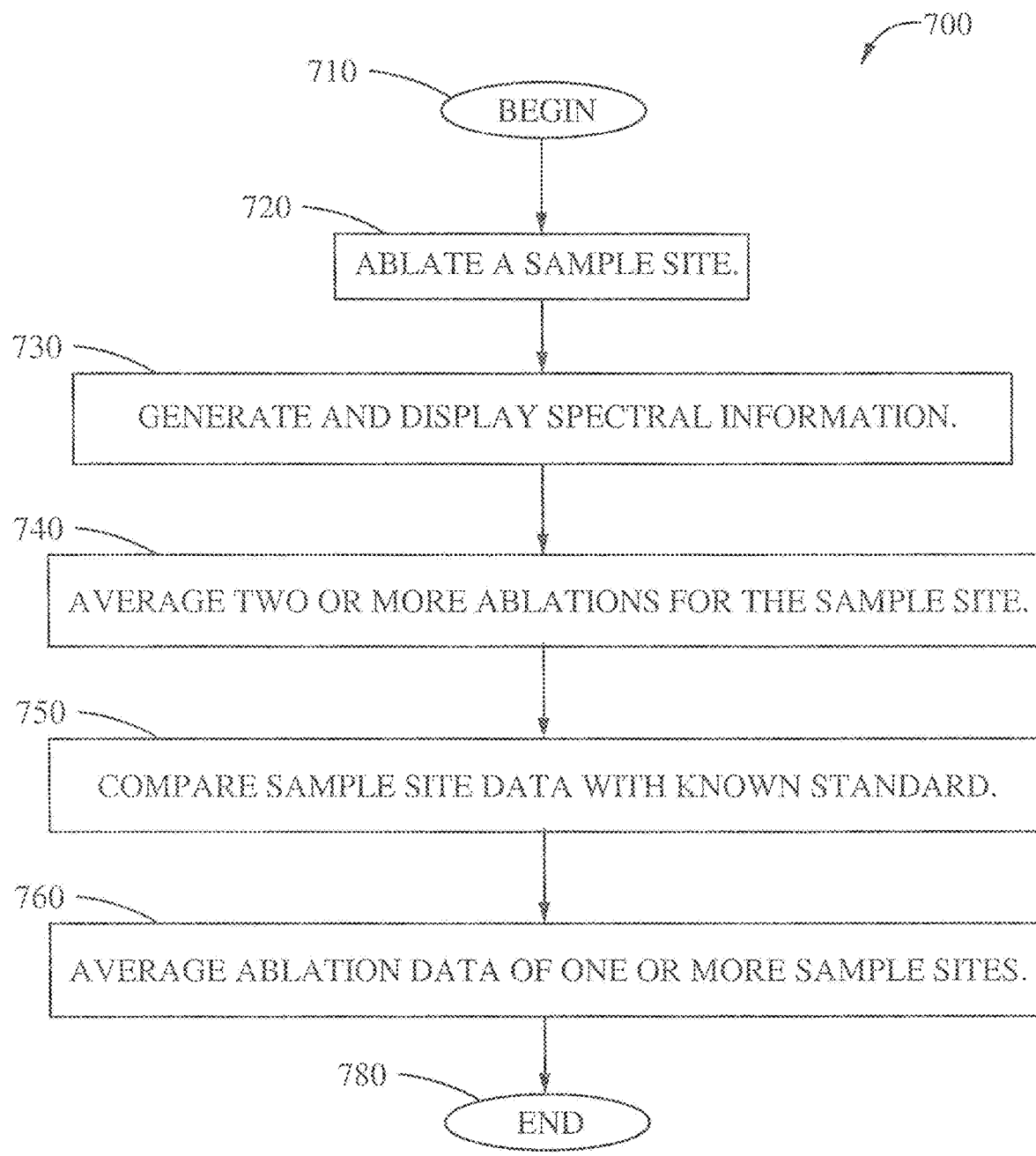
FIG. 7 illustrates a process flow diagram for a method of ablating.

FIG. 7 shows a process flow diagram for a method 700 of laser spectroscopy according to an embodiment of the present invention. The laser ablation apparatus 100 (FIG. 1) is used as an example. The method 700 begins at the step 710. In one embodiment, the method 700 can be fully automated using application software included in the system computer 140. A specific protocol can be entered into the application software instructing the application software of desired parameters or settings for the apparatus 100. Alternatively, the method 700 can be manually performed. At the step 720, a laser pulse is generated to ablate the sample site 110 into an emissive plasma plume. A real-time video image of the sample site 110 is generated on a first window 218 of the GUI 200. The real-time video is received from the video camera 116. The plasma plume 114 is analyzed by the spectrometer 120 and the detector 130. The plasma lumina and the electromagnetic radiation generated by the plasma plume is optically communicated to the spectrometer 120 and detected by the detector 130. The position sensor 112 provides a displacement signal to the system computer 140 indicating any change in the height of the sample site 110. The system computer receives spectral information from the spectrometer 120 and the detector 130.

At the step 730, the system computer 140 generates spectral and wavelength information for presentation on the display 142. In one embodiment, intensity and wavelength data are represented as waveforms on the GUI 200. The waveform is presented in a second window 220 of the GUI 200 and includes the intensity and wavelength data. In another embodiment, a second waveform is superimposed on the first waveform 222 in the second window 220. The second waveform can include additional spectral information. For example, particle imaging information, tracking information or scaled or gated representations of the first waveform 222.

At the step 740, the steps 720 and 730 are repeated for each sample site on the sample. The spectral data for a total number of laser ablations for the sample site 110 can be averaged together. In an exemplary embodiment, the total number of laser ablations for the sample site 110 equals three laser ablations. The spectral data of the three laser ablations are averaged together to generate a 'site sum'. The site sum is a reliable and accurate representation of the elemental composition of the sample 105 at the sample site 110. Alternatively, the site sum comprises spectral data from two laser ablations. In another embodiment, the site sum comprises spectral data from one laser ablation. In still another embodiment, the site sum comprises spectral data from four or more laser ablations.

At the step 750, the site sum can be compared with spectral information generated from performing the method described herein on a known standard material. The known standard material comprises specific known elements at a known composition. Laser spectroscopy performed on the known elements generates known spectral data including known intensity values. An elemental composition for the sample site 110 can be approximated by comparing the site sum with the known standard spectral data.

At the step 760, the steps 720 through 750 can be repeated for one or more additional sample sites to generate additional site sums. The spectral data for the total number of site sums can then be averaged together. In an exemplary embodiment, the total number of site sums equals twenty. The spectral data of the twenty site sums can be averaged together to generate a 'sample sum'. The sample sum is a reliable and accurate representation of the elemental composition of the sample 105 as a whole. Alternatively, the total number of sites sums can be ten or fewer. In another embodiment, the number of sites sums can be thirty or more.

The apparatus 100 can perform laser ablation or laser induced breakdown spectroscopy (LIBS) on a variety of materials. The materials can be heterogeneous or homogeneous solids or semi-solids. Alternatively, the materials can comprise a liquid or even a gas. In another embodiment, the apparatus 100 can be used for LIBS on biological materials. Analysis of biological material can include building a library of known spectral signatures including elemental and compositional data for specific biological material. The spectrometer 120 can collect and detect with the detector 130 spectral information on a broad range from 200 to 900 nm. An unknown biological sample can be compared with the library to determine the biological substance. The method ends at the step 780.

In an alternative embodiment, the method 700 can be used in a remote configuration. The sample material is positioned in a location that is remote from the ablation source or laser. A telescopic device can be integrated with the apparatus 100 to provide optical coupling of plasma lumina. The generation and analysis of spectral data can proceed similarly as described herein. Furthermore, other spectroscopies, in place of and/or in addition to optical emission spectroscopies can be used to obtain characteristic ablation spectral data within the scope of the present invention. For example, laser ablation inductively coupled plasma mass spectrometry (LA-ICP-MS) can be applied in conjunction with and/or as an alternative to the LIBS technique described herein.

Still further embodiments can be understood with respect to FIGS. 8-13B. Like numerals in FIGS. 8-13. Like numerals in FIGS. 8-13 designate corresponding elements.

Figure 8:
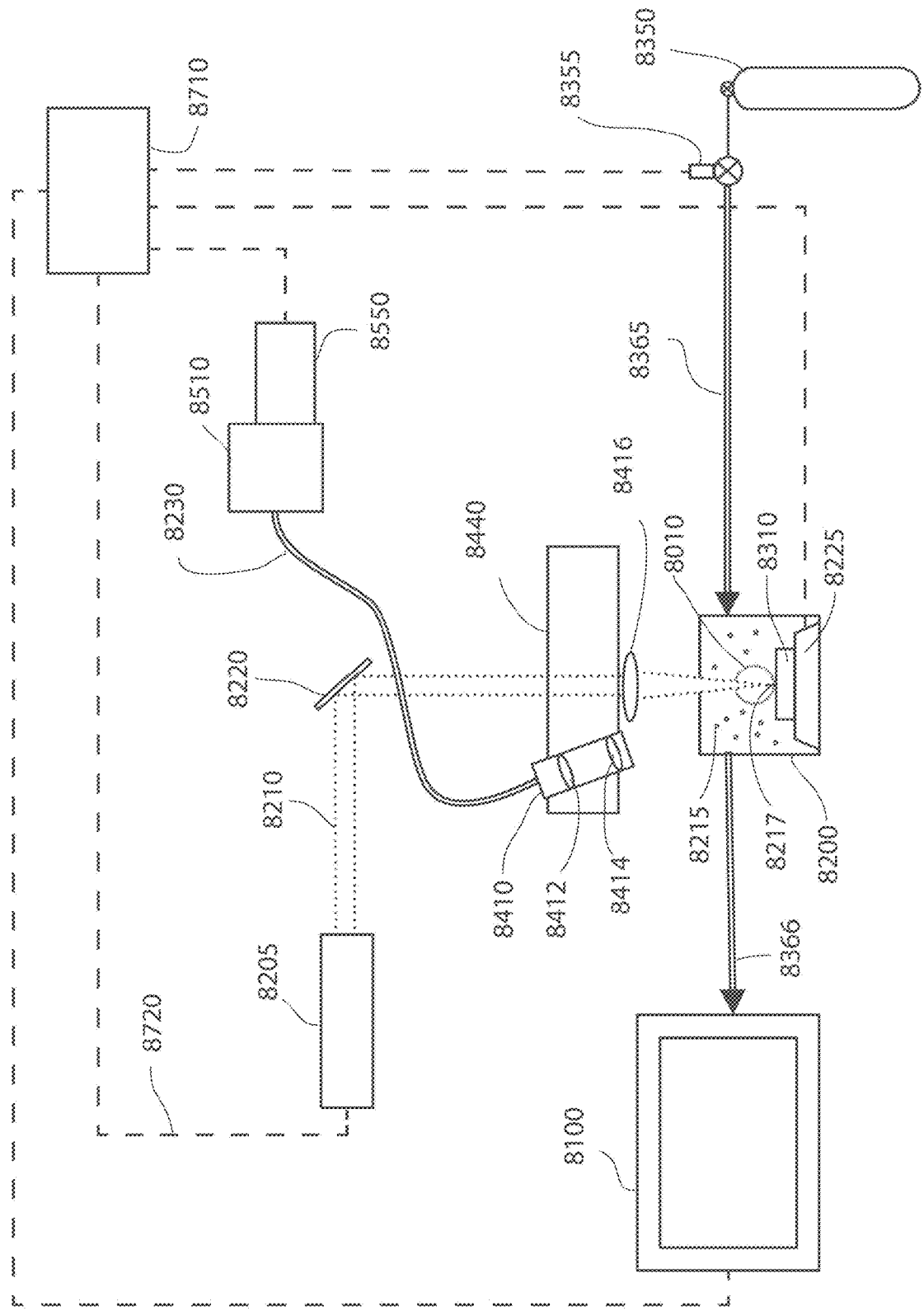
FIG. 8 is a simplified diagram of apparatus for laser induced ablation spectral analysis including LIBS and LA-ICP-MS.

FIG. 8 is a simplified drawing of a system for laser induced ablation spectral analysis of a sample. The system has a movable stage 8225 coupled to x-y-x translation motors (not shown) that can move a sample 8310 on the stage in three independent directions. The system also has a laser 8205 that can emit a pulsed laser beam 8210, and has various optical elements such as a mirror 8220, laser beam focusing optics module 8416 and/or others that can cooperatively focus the laser beam onto a selected sample site 8217 for ablation. The sample 8310 and stage can be in an unreactive gaseous atmosphere confined within enclosure 8200. The atmosphere in the enclosure can be transparent at wavelengths comprising pulsed laser beam and/or characteristic spectral emission emanating from the plasma plume 8010. In a preferred embodiment, the pulsed laser 8205 can be a Nd YAG laser emitting a pulsed laser beam with a near infrared wavelength of 1064 nm, and the unreactive atmosphere can be inert gas such as helium and/or argon.

However, an ultraviolet wavelength selected from among 193 nm, 266 nm and 193 nm is preferred for the ablation for some applications, particularly when performing analyses using ICP-MS. UV wavelengths can provide a better sample of gaseous species from a sample site by comparison to a more conventional pulsed laser wavelength in the near infrared. Short UV wavelengths can be generated as harmonics of longer wavelength excimer and/or solid-state lasers as will be understood by those having ordinary skill in the art.

Figure 12A:
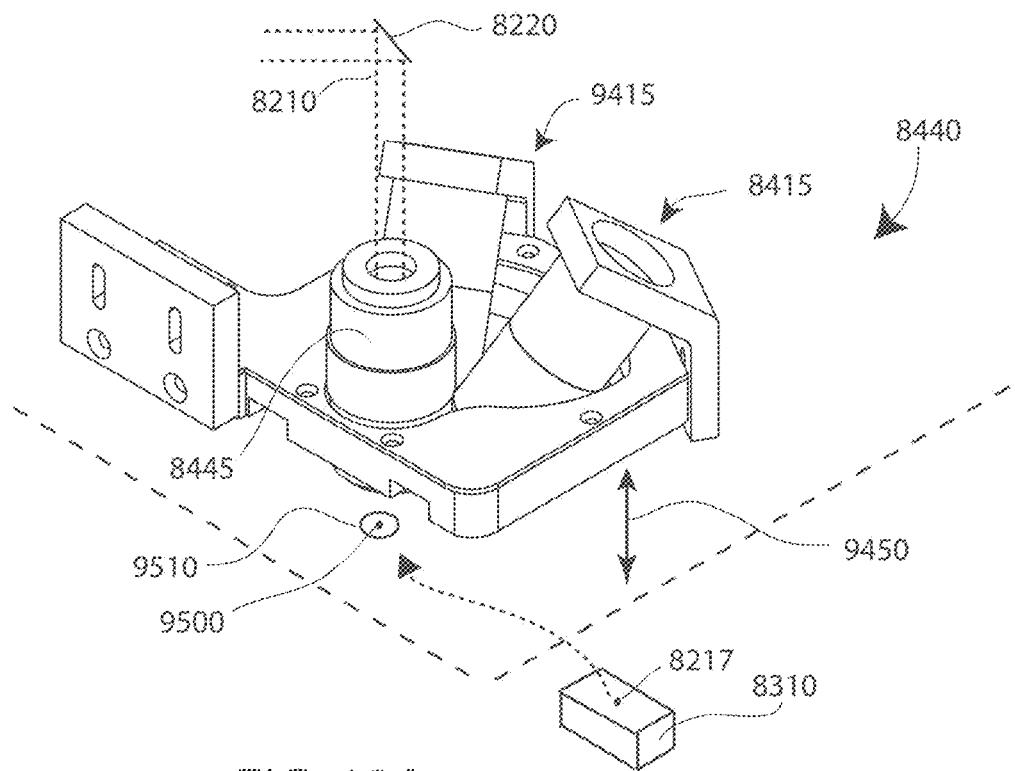
FIG. 12A is an isometric view of an optical frame for a LIBS apparatus.
Figure 12B:
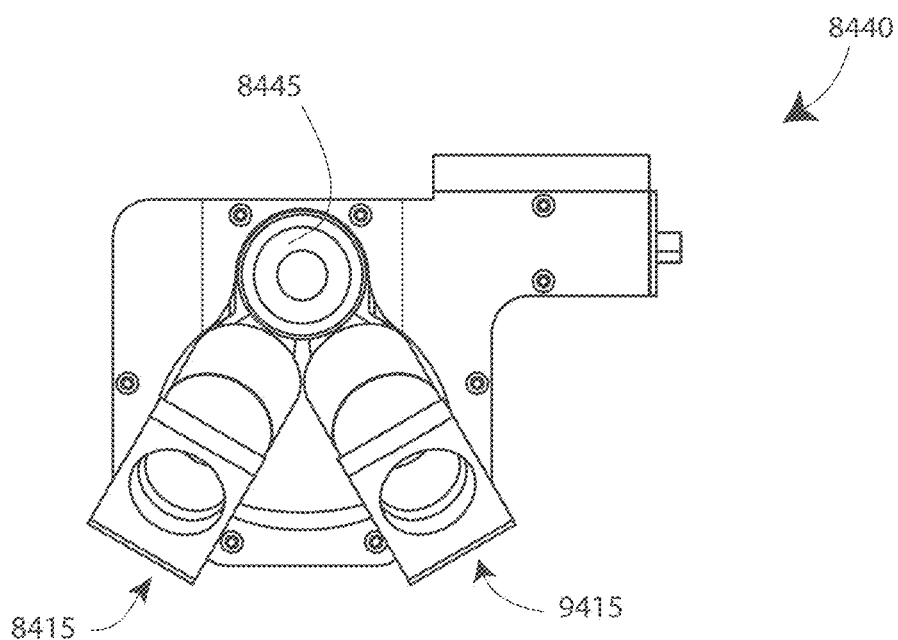
FIG. 12B is an overhead view of the optical frame shown in FIG. 12A.

Characteristic spectral emission emanating from the plasma plume 8010 generated by ablation can be gathered with a collection optics module 8410. The collection optics module can couple the spectral emission into a lightguide 8230. The lightguide can transmit the optical emission to an optical spectrometer comprising wavelength separation unit 8510 and detector 8550. The collection optics module can include lenses 8412, 8414 and/or other optical elements and is disposed in a preselected position and orientation by optical frame 8440. Further details of an optical frame structure 8440 are disclosed in FIGS. 12A, 12B and 13. As shown in FIG. 12A, the laser beam focusing optics module 8445 is secured to frame 8440 in a position where it can center a precise laser spot circle 9510 of predetermined size in plane 9460 on a point 9500. Plane 9460 is a preselected distance 9450 below optical frame 8440. Accordingly, stage 8225 can movably translate a selected sample site 8217 (also see FIGS. 9-10) to the center laser spot circle position to perform precise and consistent laser ablation of material from the selected site.

As can be understood with respect to FIGS. 10-13, the optical frame 8440 has support substructures 8415, 9415 operable to secure collection optics modules 8410 and/or 9410 in a preselected position with respective central axis/axes 8416 and/or 9416 of each collection optics module aimed at a situs 9300 of the plasma plume. This arrangement positions each laser ablation and its ensuing plasma plume in the same location relative to the optics support structure 8440. Accordingly, each optics support substructure 8415, 9415 can hold a respective collection optics module 8410, 9410 in a fixed position and orientation that can optimize light collection from a plasma plume arising from the spot circle position.

In various embodiments, a gas flow system such as shown with respect to FIG. 8 can maintain an atmosphere of unreactive carrier gas in sample/stage enclosure 8200. A source of pressurized unreactive gas 8350 can be coupled to a flow controller 8355 through a fluid channel comprised of conventional tubing, pipe and/or fittings. The flow controller 8355 can deliver a selected flow rate of the carrier gas to enclosure 8200 through fluid passage 8365. Flow controller 8355 can be a pneumatic flow controller, an electronic mass flow controller, a fixed orifice, and others. The flow rate can be controlled using a computer 8710 to actuate the flow controller and/or provide a setpoint by way of a communication channel represented by the dashed line between a computer 8710 and flow controller 8355.

In some embodiments, gaseous laser ablation products 8215 generated in chamber 8200 can be transported in the carrier gas from enclosure 8200 to an inductively coupled plasma-mass spectrometer (ICP-MS) 8100 through flow channel 8366. In various embodiments, the gaseous laser ablation products can include permanent gases, vapors, molecular clusters, suspended particles, aerosols and/or others. The inductively coupled plasma-mass spectrometer (ICP-MS) 8100 is operable to perform a further spectral analysis of the ablation products based on the mass of ionized species. In various embodiments, the ICP-MS comprises an inductively coupled thermal plasma sustained in an inert carrier gas such as argon. Those having ordinary skill in the art will recognize that thermal plasma sustained in the ICP-MS 8100 have sufficiently high temperature (over 5000 K) to ionize the gaseous laser ablation products. Ionized products from the thermal plasma are introduced into a mass analyzer within the ICP-MS where they can be separated and identified based on characteristic charge to mass ratio. Accordingly, the ICP-MS analysis can provide additional information useful to augment, improve, and/or confirm an emission spectroscopy determination of sample site composition based on lumina from the plasma plume.

It has also been found that ICP-MS may not be particularly effective to determine relative relatively light elements (atomic number less than about 10) and elements generally found in organic compounds (carbon, hydrogen, oxygen and nitrogen). In this regard, it has been found that the LIBS analysis can complement and quantify the concentrations of various elements that may not be acceptably measured using ICP-MS alone. Furthermore, it is difficult to measure high concentrations of elements (bulk composition analysis) in an ICP-MS while simultaneously performing trace level chemical analysis with the same instrument. On the other hand, ICP-MS is highly sensitive and can perform trace level detection/analysis at levels as low as 1 part per billion, and under some circumstances even lower levels are operable. It has been found that a combination of laser ablation emission spectroscopy and laser ablation ICP-MS can determine both high concentration level analysis as well as trace levels at 1 ppm or even 1 ppb of a single sample site, which could not be performed using either laser ablation emission spectroscopy or laser ablation ICP-MS alone. Yet another advantage having both techniques in combination arises from an ability to detect pulse-to-pulse variations in the amount of ablated material based on a signal level in from wideband emission spectra. The emission signals can be useful to normalize and/or correct the ICP-MS mass/charge intensities thereby improving accuracy.

A system with respect to FIG. 8 can include at least one computer 8710. The computer comprises machine readable media operable to store data and instructions and a processor that can read the data and perform the instructions. Furthermore, media has various modules operable to effectuate various control functions, control loops, displays, human interfaces, and others. The dashed lines 8720 shown in FIG. 8 represent communications channels between the computer and various system components such as pulsed laser 8205, ICP-MS 8100, an optical spectrometer wavelength separation unit 8510, a spectrometer detector 8550, an electronic flow controller 8355, and a stage position controller for x-y-z stage 8255. The system can also include communications channels for a sample site position sensor, and other physical and/or software components not shown in FIG. 8. It will be recognized that a communication channel can be implemented in various different ways. For example, data and/or instructions can be carried by way of physical media as point to point wiring, over a parallel bus, over serial and/or parallel fiber optic connections, with a virtual circuit in a network protocol layer, and/or others.

It will be understood that various embodiments with respect to FIG. 8 can further include a number of additional elements and structures disclosed in relation to FIGS. 1-7 above. These elements are been omitted from the drawing to avoid obscuring other concepts simplify the explanation. By way of example, a system with respect to FIG. 8 can include a video camera, a sample site position sensor and an x-y-z stage position controller in a stage position control circuit, a triangulation laser, and others. Furthermore, some embodiments do not include all of the elements and subsystems shown. For example, there are embodiments with an ICP-MS. In these embodiments unreactive carrier gas from enclosure 8200 can be vented into an exhaust line (not shown).

Figure 9:
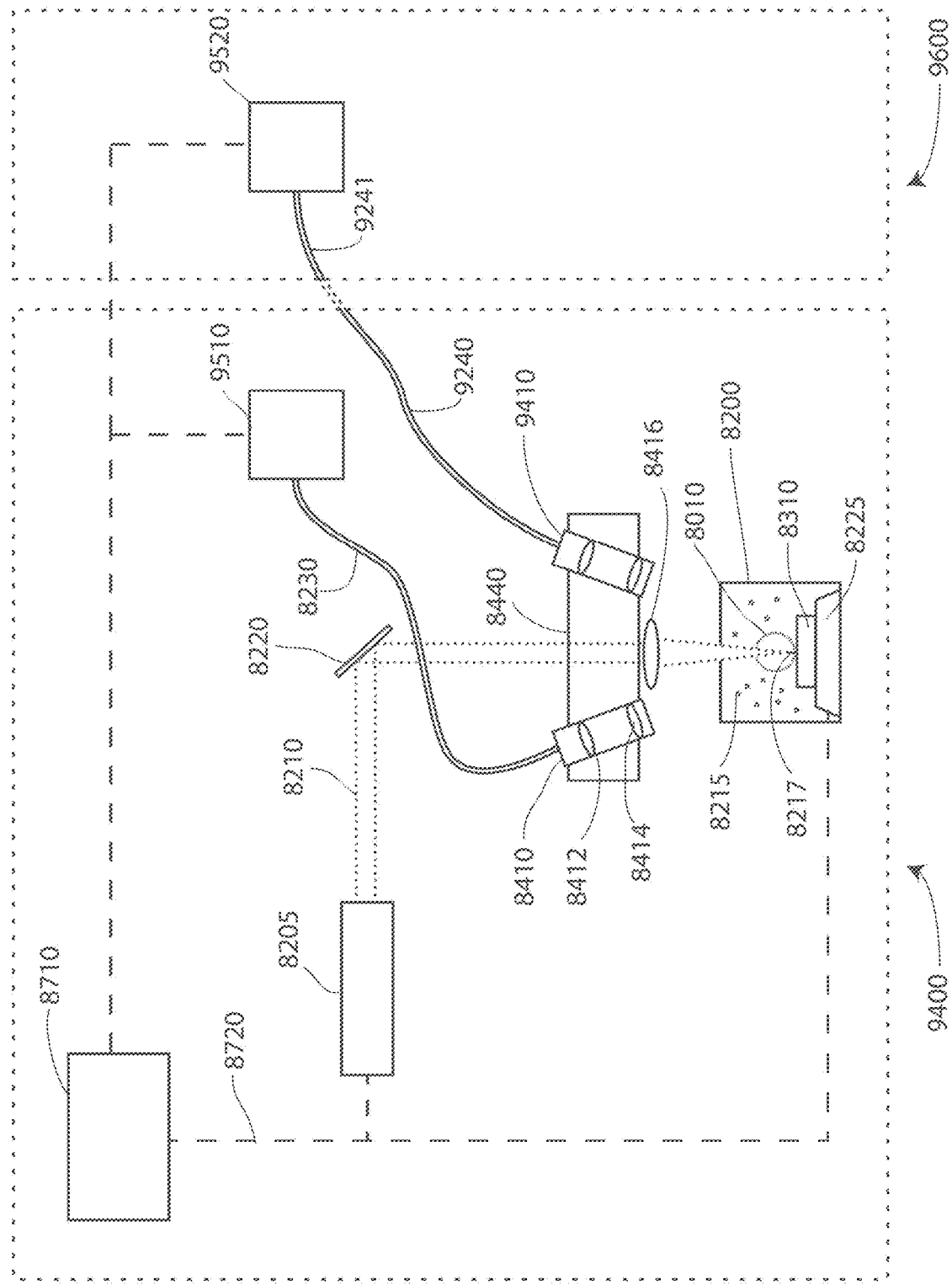
FIG. 9 is a simplified diagram of apparatus for laser induced ablation spectroscopic analysis comprising collection optics modules and fiber bundles to couple optical emission to spectrometers.

Other embodiments of a system for material analysis using LIBS can be understood with respect to the simplified diagram in FIG. 9. A system with respect to FIG. 9 comprises a master system module 9400, and can have an optional extension spectrometer module 9600. The master system module 9400 can include any of the elements and/or structures disclosed with respect to FIG. 8, including elements not shown in FIG. 9 (e.g. the carrier gas components 8350, 8355, and others are omitted for clarity). The optical frame 8440 of master unit 9400 is operable to support a second collection optics module 9410. The second collection optics module can gather spectral emission from a plasma plume 8010 and couple the light into a second lightguide 9240. Lightguide branch segment 9241 can deliver spectral emission to extension spectrometer 9600. In some embodiments lightguide segment 9240 in the master module and segment 9241 in the extension spectrometer module can be portions of one single continuous fiber. In further embodiments, segments 9240 and 9240 can be physically different fibers optically joined through an interface connection between the master module and the extension spectrometer module.

An operable system with respect to FIG. 9 can comprise a master system module without any extension spectrometer 9520 (master only). The master only configuration can perform laser ablation optical spectroscopy using spectrometer 9510. Furthermore, a master only system can be field reconfigured to add an extension module. An extension model upgrade can add the capability to acquire emission spectra from a plume from the master system module spectrometer 9510 and extension spectrometer 9520 simultaneously. Spectral data from similar and/or different types of detectors in spectrometers 9510 and 9520 can be communicated to computer 8710 through communication channels 8720. A collection optics module 9410 to acquire plasma plume light emission for the extension spectrometer module 9600 can be included in master unit module 9400 when it is shipped from the factory, or a second collection optics module 9410 can added to an optical frame 8440 in the field. Various embodiments with respect to FIG. 9 comprise an optical frame 8440 having collection optics module support substructures 8415, 9425, shown with respect to IGS. 12A, 12B and 13, to hold respective collection optics modules 8410 and 9410 in a preselected positions and orientations as shown.

Figure 13:
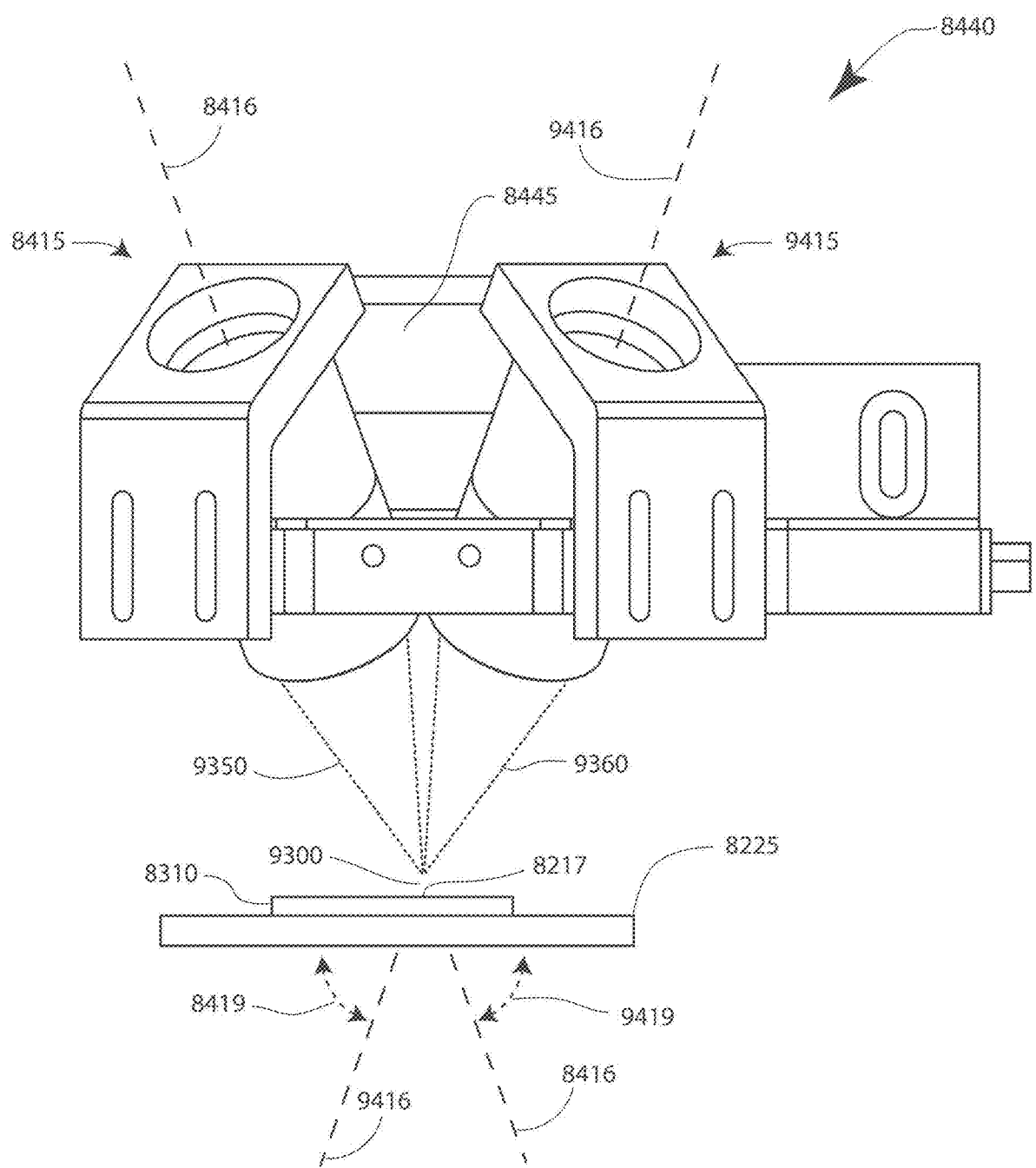
FIG. 13 is a side view of the optical frame shown in FIGS. 12A and 12B.

As shown with in FIG. 13, the supporting substructures 8415 and 9415 can have mirror symmetry with respect one another to be in predetermined positions directing the central axis 8416, 9416 of each collection optics modules to a point 9300 equidistant from each module, where the pulsed laser 8205 spot circle can generate a precise plasma plume. The central axes 8416, 9416 intersect an x-y plane parallel to the stage at equal angles 8419, 9419, from which each module can view from a plume at 9300 and capture equal portions of the light through equal solid angle cones 9350, 9360 subtended by the collection optics modules.

Figure 10:
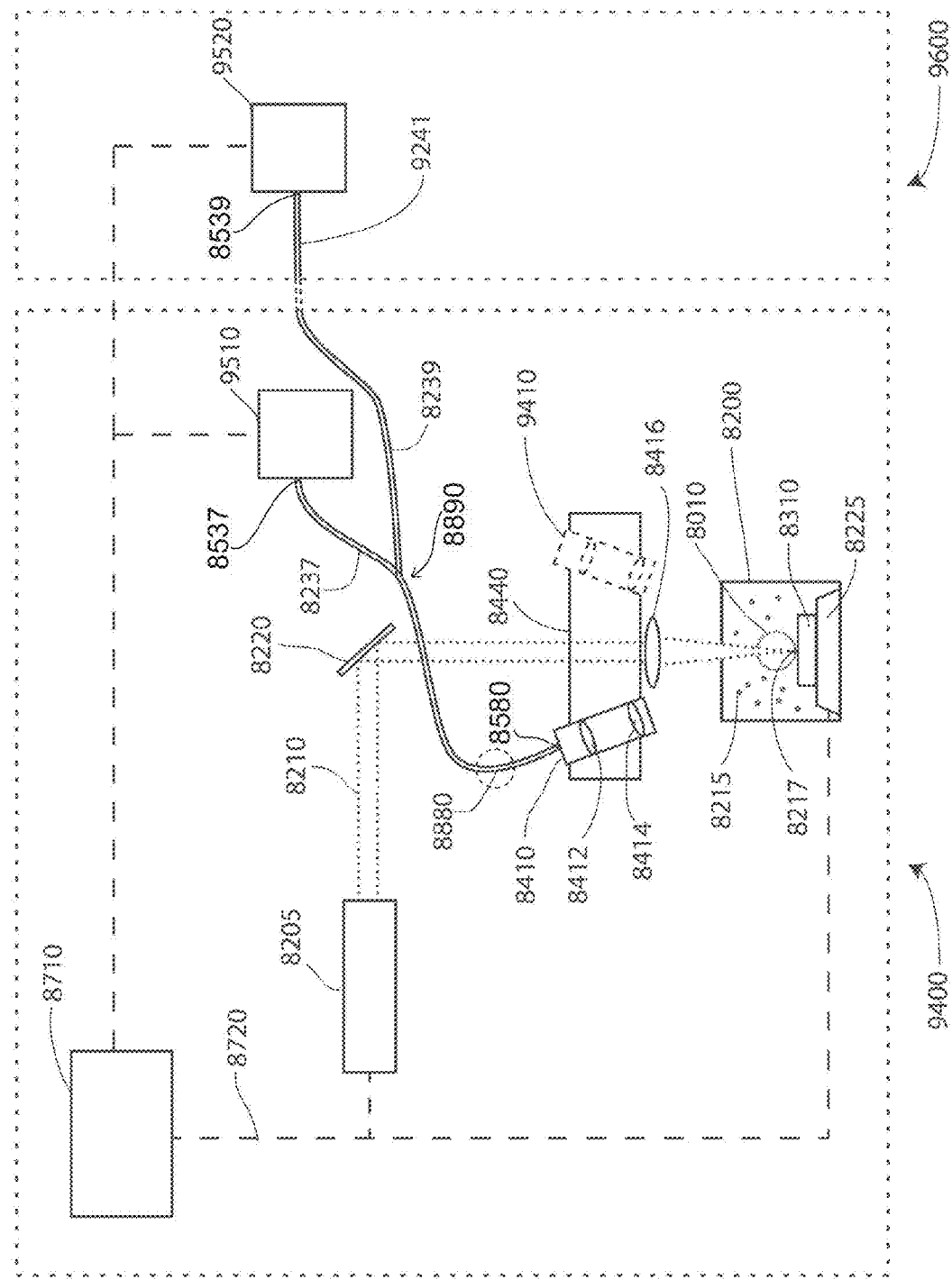
FIG. 10 is a simplified diagram showing an apparatus for LIBS having optical collection modules and lightguides for internal and optional spectrometer modules.
Figure 11:
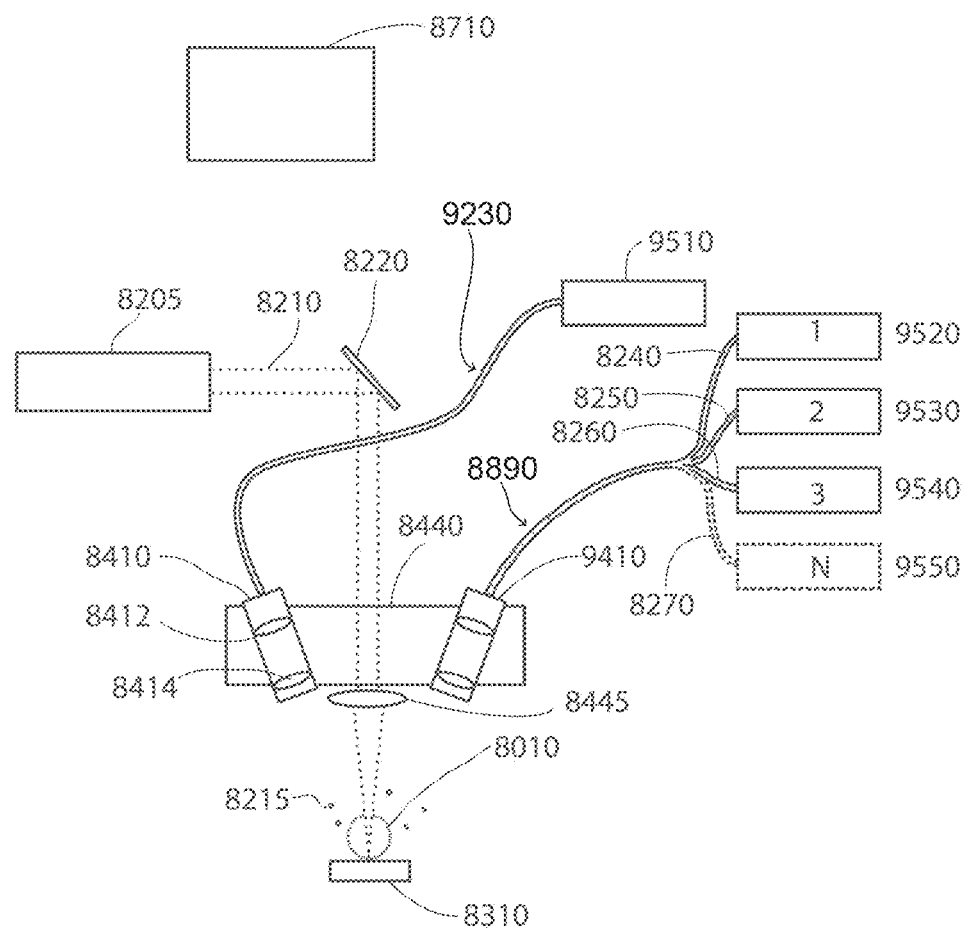
FIG. 11 is a simplified diagram of apparatus for laser induced ablation spectroscopic analysis for LIBS having one optical collection module coupled to an optical fiber bundle having split ends for an internal spectrometer and an optional spectrometer module.

In various other embodiments, a master system module can include one or more of the additional spectrometers and structures shown in an extension module with respect to 9-11 (e.g. a single master module LIBS system can comprise various spectrometers, lightguides (optical fibers), and others disclosed with respect to FIGS. 9-11), within one physical unit (the instrument).

Some further LIBS system embodiments can be understood respect to FIG. 10. A branched fiber optic lightguide 8880 can have a trunk bundle of optical fibers 8890 configured to gather light from an emissive plasma plume 8010 into the plasma plume light receiving trunk end 8580 of lightguide 8880. In various embodiments, a collection optics module 8410 shown in FIG. 10 can be useful to improve light gathering efficiency. Light from the plasma plume 8010 is gathered into the trunk end of the branched fiber optic lightguide cable and transmitted through all of the optical fibers in the trunk of the branched fiber optic cable lightguide. The truck bundle of fibers is subdivided among a plurality of fiber optic cable branches comprising exclusive subsets of the entire bundle of optical fibers in the trunk. The subset portions of optical fiber bundles in branches 8237 and 8239 run to respective distal terminal ends 8537 and 8539 of the respective branches. Portions of plasma plume light can be transmitted through the exclusive subsets of fibers in branches 8237 and 8239 into spectrometers 9510 and 9520 through rends 8537 and 8539 of the respective branches.

In some embodiments, all of the fibers in a branched fiber optic lightguide have the same diameter. Furthermore, each of the fiber optic branches 8237, 8239 can have different numbers of fibers. Accordingly, in some embodiments, luminous flux gathered through the light receiving trunk end of the branched fiber optic cable 8890 can be divided among the split distal terminal ends in proportion to the number of fibers in each branch. In a number of embodiments relative to FIG. 10, the total spectral power from collection optics module 8410 entering the entire bundle of optical fibers in the trunk 8880 of the branched cable through trunk end 8580, can be split to deliver a relatively smaller portion of the total power emanating from the branch terminal end 8537 of one branch 8237 comprising a relatively smaller number of fibers, and a second branch 8239 comprising a relative larger number of fibers can deliver a relatively larger portion of the total power emanating from its branch terminal end 8539. The smaller portion of power can be delivered to a high sensitivity and/or low efficiency spectrometer 9510, and the larger portion of the power can be delivered to a low sensitivity and/or low efficiency spectrometer 9520. It will be appreciated that splitting total power in this manner can provide relatively more illumination where more power is necessary and/or desired, and relatively less illumination can be directed to a spectrometer where light intensity from the collection optics module might otherwise saturate its detector.

Relative to systems having two independent collection modules and two independent lightguides disclosed with respect to FIG. 9, use of a spit end lightguide, and/or split end lightguide optical power distribution system distribution (FIG. 10) can save the costs associated of a second collection module 9410 and/or second collection module support structure elements on the optical frame 8440.

Still further embodiments are disclosed relative to FIG. 11. A system with respect to FIG. 11 can provide a first collection optics module 8410 configured to optimize the amount of luminous power received by spectrometer 9510 through a conventional unbranched fiber optic lightguide 9230. Those having ordinary skill in the art will appreciate an unbranched fiber optic lightguide 9230 will carry a relatively greater amount of light from the plasma plume to a spectrometer 9510, by comparison to a branched fiber optic lightguide 8890 capturing the same amount of light into an equivalent trunk cross section (the entire bundle of fibers in a unbranched fiber optic lightguide can be viewed as a trunk, since entire bundle in the light-receiving end run to the spectrometer 9510, whereas the light gathered into the receiving end of the branched fiber optic lightguide 8890 is subdivided among a plurality of branches and spectrometers). Accordingly, in embodiments where the spectrometer sensitivity is low and/or or limiting, such as where a Czerny Turner spectrometer is used to examine a relatively narrow spectral region, it is often advantageous to use an unbranched fiber optic lightguide 9230 in order to provide a relatively maximal amount of light to a low sensitivity spectrometer 9510. An ICCD detector can be used to further enhance the sensitivity of this configuration.

Various embodiments can additionally include a collection optics module 9410 coupled to the proximal principal (trunk) end of an n-way split terminal end fiber optic bundle (e.g. a branched fiber optic lightguide where the number of branches n is two or more). Each branch has an exclusive subset of the full bundle of fibers in the trunk 8880 of the branched fiber optic lightguide can convey spectral emission to a separate spectrometer. An embodiment with respect to FIG. 11 comprises a fiber lightguide assembly having 4 branch bundles 8240, 8250, 8260, 8270 configured to couple light to 4 respectively different spectrometers 9520, 9530, 9540 9550. Various further embodiments can have N different spectrometers coupled to a collection optics module with using an N-way split branched fiber optic lightguide. There are also embodiments having a plurality of collections optics, where at least two of the modules are coupled to first and second pluralities of different spectrometers (e.g. N and M) using N-way and M-way split end fiber optic lightguides. In this regard, all of the spectrometers in system embodiments disclosed herein can be operable to simultaneous receive the spectral emission emanating from each plasma plume generated in a laser ablation of a sample site.

An LIBS system with the capacity to analyze the spectral emission from the plasma plume at an ablation site in real time, using a plurality of optical spectrometers to receive spectral emission simultaneously, and/or in tandem, has many advantages that enable superior analytical capability relative to prior art systems. Wavelength separating elements (monochromators, polychromators, filters, and others) as well as the detectors (i.e. CCD, ICCD, EMCCD, and silicon photodiode detector arrays, and others) useful in an optical spectrometer have absolute and spectral sensitivity limitations that can make it impractical and/or impossible to have sufficiently high spectral resolution, sensitivity, spectral bandwidth, and temporal resolution in a single optical spectrometer instrument that is operable to broadly determine a composition of unknown samples by LIBS multiwavelength analysis in real time. However, an individual spectrometer can be optimized to enhance sensitivity, resolution, and/or temporal resolution over limited range wavelengths. Accordingly, a plurality of optical spectrometers, individual selected and/or tuned to have optimal characteristics in a limited wavelength region, can provide spectroscopic analyses that are beyond capability of a single spectrometer system.

Analysis of a sample site by optical emission spectroscopy of the ablation plasma plume also can be limited by inherent characteristics of the plasma plume itself. For example, continuum emission can obscure characteristic spectral lines emanating from the ablated material from a sample site. As already disclosed above, continuum interference can be diminished and/or eliminated by using a high-speed detector that is gated to exclusively detect line emission during a time interval after continuum intensity has decayed. Nevertheless, there are also inherent limitations arising from spectral overlap, interference, broadening, and/ or low emission intensity at certain characteristic wavelengths, that remain difficult and/or impractical to overcome. Emission spectra analysis has some limitations can be traversed by applying a different spectral technology. For example, an ICP-MS can perform elemental and/or isotopic composition analyses at material concentrations well below 500 ppb, or even less than 1 ppb, that are inaccessible using emission spectroscopy alone. In various embodiments with respect to FIG. 8 simultaneous analysis of gaseous species from a sample site using ICP-MS can provide complementary ion mass to charge ratio peak intensity analytical information. In various embodiments, computer 8710 has analytical software operable to determine the composition of a sample site based on the spectroscopic data from plasma plume emission and the ICP-MS ion mass/charge ratio intensity data as a whole. It is found that the analysis based on LIBS optical emission spectroscopy and ICP-MS ion mass/charge ratio peak intensity data as a whole can detect far more elements, and can have greater analytical accuracy relative to LIBS emission spectroscopy or ICP-MS alone.

A multi-spectrometer system such as disclosed relative to FIGS. 8-11 can have use different types of optical spectrometers and detectors at the same time to advantage. Some embodiments comprise a scanning Czerny Turner spectrometer (CZ) coupled to an ICCD detector. This combination can effectuate extremely high sensitivity owing to maximal light throughput to the ICCD (high efficiency) from the spectrometer, and ICCD capability to amplify weak signals in the detector. Accordingly, it is advantageous where the highest possible sensitivity is needed to detect numerous different elements present in the range of 1 to 10 parts per million. However, this combination has the disadvantage that it can only capture a relatively narrow range of preselected wavelengths with a predetermined spectral resolution. Furthermore, the wavelength range and resolution vary inversely. The higher the spectral resolution, the narrower the range of wavelengths that can be covered at one time. Accordingly, to capture high resolution spectral information from atomic elements having spectral emissions in widely separated wavelength regions using only one CZ-ICCD, the CZ must be sequentially reconfigured to access each of the separated wavelength regions, and an additional ablation of the sample site must be performed after each reconfiguration to generate the spectral emissions for capture.

An embodiment may also include an Echelle spectrometer coupled to an ICCD detector. This combination has the advantageous capability of being able to capture a broad range of wavelengths at one time in emission from the plasma plume arising from a single ablation (a typical range is 200 nm-900 nm, although in a preferred embodiment the range is 190 nm-1040 nm and it can be greater). On the other hand, an Echelle spectrometer generally has low light throughput (low efficiency). For example, an Echelle spectrometer can typically have f/10 aperture light throughput whereas a typical CZ spectrometer generally has about throughput in the range of f/3 to f/4. It can be seen that an Echelle-ICCD system is insensitive by comparison to the CZ-ICCD.

Accordingly, some embodiments comprise a plurality of CZ-ICCD spectrometers wherein each spectrometer is configured to receive a different preselected wavelength range. The plurality of spectrometers as a whole can capture a broad range of wavelengths at one time yet have very high sensitivity and resolution. The wavelength ranges can be contiguous and/or can be separated. Furthermore, various wavelength ranges can be non-overlapping or can have overlapping segments. All of the spectrometers can receive a portion of spectral emission a plasma plume simultaneously from one collection optics module through a split end fiber optic lightguide (described above with respect to FIGS. 10-11), and/or at least some of the spectrometers can receive equal portions of luminous energy from a dedicated of collection optic module as shown with respect to FIGS. 9, 11, and 12-13. One or several of these spectrometers can include a transmission grating operable to provide enhanced sensitivity in the red and near-infrared spectral region.

Some further embodiments comprise an array of Czerny Turner-CCD optical spectrometers (e.g. each comprising a Czerny Turner monochromator with a CCD detector). Each spectrometer covers a preselected, non-overlapping, wavelength region. The array of spectrometers is operable to acquire spectral data synchronously from each ablation. The embodiments have an advantage of being able to capture broadband spectral information in a wide range of wavelengths. For example, an operable range of wavelengths can be 190 nm-1040 nm, although a narrower range can be preferable for greater resolution, depending on the application. In some embodiments there can be overlapping spectrometer wavelength regions. A partially overlapping wavelength region can be useful to calibrate the response of the different spectrometers regions with respect to one another using regions of overlap.

The various detectors and monochromators/spectrometers have advantages and disadvantages with respect to one another. For example, while a CCD detector is generally less sensitivity than an ICCD, CCD technology is relatively inexpensive in comparison to an ICCD having an equivalent number of channels. A CCD detector is well suited for broadband analysis. Besides having less sensitivity, another limitation of CCD detector arrays is that they cannot be gated on and off in very short intervals to discriminate against continuum emission and/or other interference.

In the analysis of unknown samples, a broadband CCD spectrometer and/or array of spectrometers can be first used to survey the principal elements that are present, and identify the elements present in majority, minor, and/or trace concentration levels. After a sample is characterized using a broadband optical spectrometer (such as one comprising a CZ-ICCD or CZ-CCD combination), higher resolution lower intensity spectral data obtained from a high resolution, lower sensitivity spectrometer and/or plurality of high resolution/high sensitivity spectrometers in an array can be provide trace element analysis. As disclosed above, various embodiments can acquire both broadband and low intensity, high resolution spectroscopic data from a single ablation plume simultaneously.

In some embodiments, the sample may be in a solid phase or a liquid phase (i.e., the sample may be condensed matter). In some embodiments, the sample may be in a gas phase. In some embodiments, the sample may be an aerosol; an aerosol is a suspension of fine solid particles or liquid droplets in a gas.

In some embodiments an apparatus includes a laser, a sample holder, an emission collection system, and a spectrometer. The sample holder is configured to hold a sample. The laser is configured to apply laser energy to the sample and generate a plasma 220. The emission collection system is configured to collect optical or electromagnetic emissions from the plasma 220 that may then be input to the spectrometer.

In some embodiments, the spectrometer may be operable to detect electromagnetic radiation of a wavelength of about 200 nanometers (nm) to 900 nm. For example, the spectrometer may be operable to detect intensity and wavelength values of the electromagnetic radiation. In some embodiments, the emission collection system may include collection optics configured to receive light from the plasma and a fiber optic cable operable to transmit the light from the collection optics to the spectrometer. In some embodiments, a detector that is included as part of the spectrometer may include an intensified charge coupled device (ICCD), a charge-coupled device (CCD), or a photomultiplier tube (PMT).

There are some embodiments where a method may be performed with the apparatus 200. A laser energy is applied to a region of a sample with a laser to generate a plasma. In some embodiments, the sample may be in a solid phase, a liquid phase, or a gas phase. In some embodiments, the sample may be an aerosol. A spectrum generated by a plurality of molecular species in the plasma is recorded with a spectrometer or other device. For example, with the apparatus 200, the ablation laser may be used to generate a plasma from the sample, and the emission collection system and the spectrometer may be used to record the spectrum generated by the plurality of molecular species. The spectrometer may detect electromagnetic information (e.g., light) generated by the plasma.

In some embodiments, the laser energy may be applied to the region of the sample in a pulse of laser energy. Any laser wavelength, laser energy, and laser pulse width may be used to generate a plasma. In some embodiments, the laser wavelength may be about 1064 nanometers (nm), the laser energy may be about 50 millijoules (mJ) to 100 mJ, and the laser pulse width may be about 4 nanoseconds (ns). For example, a neodymium doped yttrium aluminum garnet (Nd:YAG) laser may be used to generate energy in the near infrared region of the electromagnetic spectrum with a wavelength of 1064 nm. With a pulse duration of about 4 ns, a laser beam with a power density of greater than one GW/cm2 at the laser beam focal point can be formed. In some embodiments, the pulse duration can be decreased to femtoseconds. In some embodiments, the laser beam can be focused to a spot size of about 10 micrometers to 500 micrometers, or about 150 micrometers to 200 micrometers.

Some embodiments may include ablating the sample with the applied laser energy. Such a process may be referred to as laser ablation or ablation.

Further embodiments may include vaporizing the sample with the applied laser energy. Other embodiments may include desorbing the sample with the applied laser energy. Some embodiments include vaporizing the sample or desorbing the sample with the applied laser energy, a plasma may not be formed with the applied laser energy. In these embodiments, the method may further include imparting additional energy to the vaporized or desorbed sample to form a plasma including the plurality of molecular species.

In some embodiments, additional energy may be imparted to the plasma. The additional energy may cause molecular species in the plasma to produce additional optical or electromagnetic emissions that can be detected with the spectrometer. In some embodiments, such additional energy may be imparted to the plasma in a microwave field or a radio frequency (RF) field. In some embodiments, such additional energy may be imparted to the plasma with an additional pulse of laser energy. For example, there are some embodiments that may include applying a first pulse of laser energy at a first angle with respect to the sample, and then applying a second pulse of laser energy at a second angle with respect to the first angle. In some embodiments, the second angle may be about 0 degrees to 90 degrees with respect to the first angle.

The plasma may include ionic, atomic, and molecular species. In some embodiments, the plasma, immediately after application of the laser energy may include a molecular species or a plurality of molecular species. In some embodiments, species atomized from the sample may react with each other to form a molecular species or a plurality of molecular species. The molecular species may include diatoms (e.g., $Na_2$, $C_2$) or excimers (e.g., $He_2$, $Xe_2$, and $XeCl$), for example.

In some embodiments, the plasma may be allowed to react with species in the surrounding environment to form a molecular species. For example, operation may be performed in ambient air under ambient pressure. Species in the plasma may react with oxygen or nitrogen, for example, in the air to form oxide molecular species or nitride molecular species, respectively. Whether the as-formed plasma includes molecular species depends in-part on the laser wavelength, the laser pulse duration, the laser power, the laser spot size, and the laser fluence. When the plasma is allowed to react with species in the surrounding environment to form a molecular species, the time needed for such a reaction or reactions also depends in-part on the laser wavelength, the laser pulse duration, the laser power, the laser spot size, the laser fluence, the sample, and the molecular species.

In some embodiments, a period of time between operations is set or specified to increase or maximize the intensity of molecular emission and to decrease or minimize atomic emission and ionic emission (i.e., emission from atoms and atomic ions). Again, this period of time depends in part on the laser wavelength, the laser pulse duration, the laser power, the laser spot size, the laser fluence, the sample, and the molecular species.

As noted above, optical or other electromagnetic emission generated by the plasma may be recorded by a spectrometer or other device. Some embodiments include recording the spectrum with visible spectroscopy, recording the spectrum with ultraviolet spectroscopy, recording the spectrum with infrared spectroscopy, or recording the spectrum with near-infrared spectroscopy. Some embodiments include recording direct optical emission of the plurality of molecular species, recording optical absorption of the plurality of molecular species, recording induced fluorescence of the plurality of molecular species, recording Raman scattering of the plurality of molecular species, recording luminescence of the plurality of molecular species, recording phosphorescence of the plurality of molecular species, recording photoacoustics of the plurality of molecular species, or recording photoionization of the plurality of molecular species.

In some embodiments, the method may be performed more than once or a plurality of times on the same region of the sample. The recorded spectrum for each repetition of the method may then be averaged. For example, in some embodiments, the method may be repeated two times or three times on a region of a sample. Performing the method on the same region of the sample multiple times and averaging the results may yield a spectrum with less noise and less experimental error.

A chamber may contain a specific gas or gasses at a specific pressure or pressures. The gas or gasses may be specified, depending on the sample being analyzed, such that desired molecular species may be formed that aid in quantifying the abundance of isotopes in the sample. For example, a gas may be selected such that the spectra formed by two molecules, each including a different isotope of an element, in the sample have an isotopic spectral shift that is able to be resolved by the spectrometer being used. Further, the sample inside the chamber may be held at a specific temperature. When a sample is held at one temperature versus a different temperature, different molecular species may be formed in the plasma. Using such an apparatus 700, some control over molecular species formed when the plasma reacts with the environment may be achieved; i.e., by controlling the plasma properties, the formation of specific molecules can be controlled.

Some embodiments, to control the gas or gases with which the plasma may react, the chamber may be operable without a chamber. In some of these embodiments, tubes or other devices may be used to deliver a gas to the region where the plasma is to be formed.

In some embodiments, laser energy is applied to a region of a sample with a laser to generate a plasma. The plasma generated may be generated in a chamber of the apparatus. The chamber may contain a specific gas or gasses at a specific pressure or pressures. A spectrum generated by a plurality of molecular species in the plasma is recorded with a spectrometer or other device.

Liquid and Solid Sample Analysis

A compact portable LIBS apparatus, capable of analyzing the elemental composition of any liquid or solid samples in real time without any sample preparation or transformation is disclosed. The disclosed LIBS instrument can be used as a universal elemental analyzer owing to its capability of analyzing plurality of sample states and material structures. Furthermore, it can be conveniently transported to different locations as needed owing to relatively small size. The suction hose and the power cables of the LIBS apparatus can be easily detached for transportation. Several instruments dedicated to analyze only one specific form of a sample can be replaced by the universal elemental analyzer. Thereby the disclosed LIBS apparatus and methods can improve process efficiency, cost, and space use. The disclosed methods include generation of aerosols from liquid samples operable to measure elemental composition, focusing and confining preselected laser beam to the aerosol using optical elements, ablating a stream of the aerosol to generate a plasma plume, collecting and gathering lights from the plasma plume, monitoring and analyzing optical spectra emitted by laser-induced plasma, and real time analysis of optical emission from the plasma plumes to detect and quantify elements. Furthermore, LIBS described herein provides a rapid chemical analysis of a plurality of samples without any requirement of consumables and/or generation of acidic waste as compared to other methods for elemental detection in the prior art.

Various embodiments of a multiphase laser ablation analysis instrument according to the instant disclosure, can effectuate quantitative elemental analyses of liquids and solids having a very wide range of physical characteristics and chemical compositions. For example, virtually any liquid such as petroleum, light and heavy fuels, liquid food products, and solvents, and/or solid samples such as rocks, batteries, solid chemical reagents, and others having homogenous and/or heterogenous material structure and compositions be analyzed.

Figure 14A:
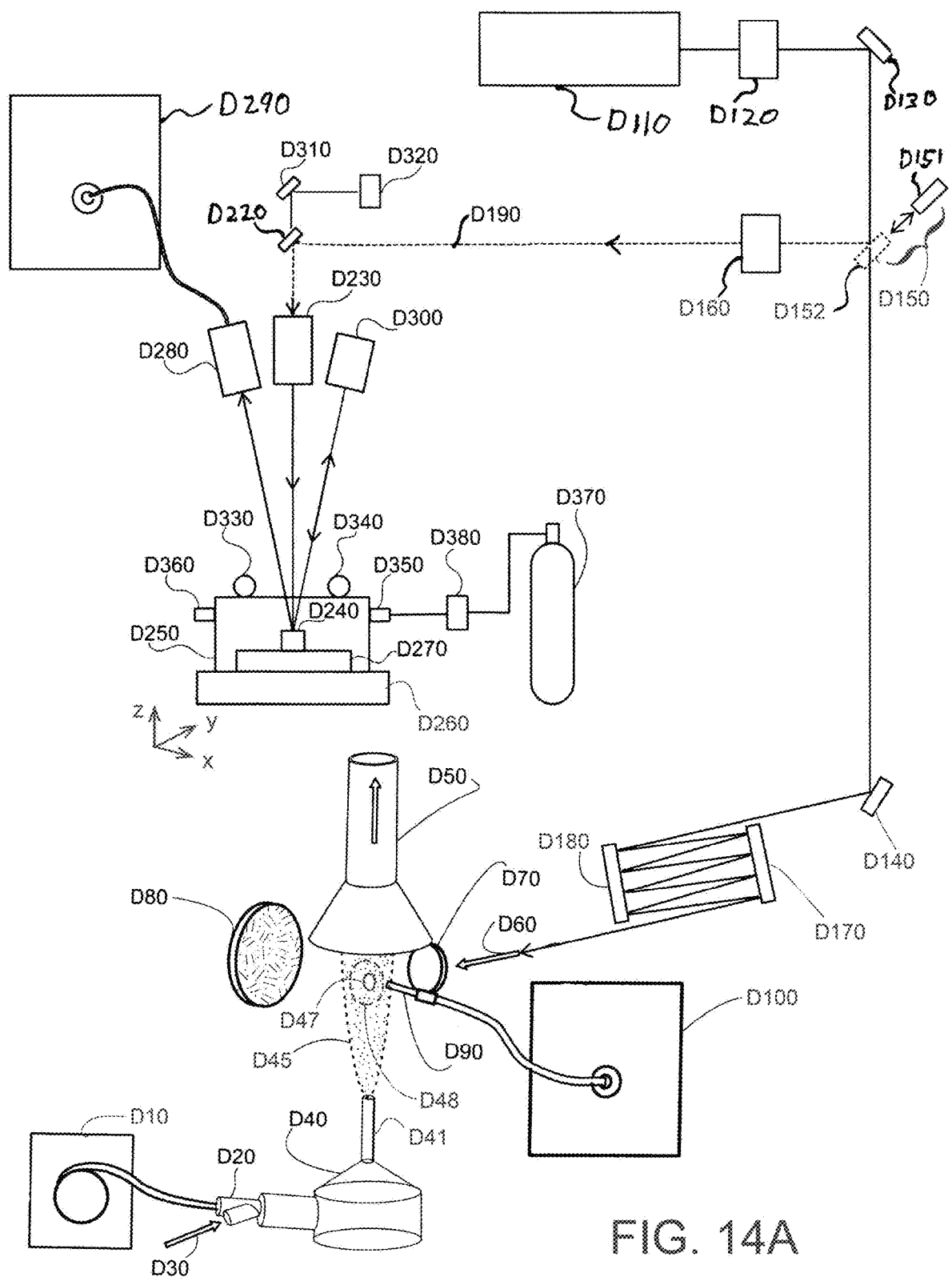
FIG. 14A illustrates a schematic diagram of an embodiment for analysis of a liquid or a solid sample.

FIG. 14A shows a schematic diagram of a LIBS apparatus and optical paths of a laser beam for analysis of a liquid phase or a solid phase sample in an illustrative embodiment according to the present disclosure. The LIBS technology for analysis of liquid and solid sample described herein comprises a liquid sample introduction system which can include a pump, a nebulizer, a gas carrier, and a spray chamber, a solid sample stage operable to move in x, y, z axes independently, a single pulsable laser with various optical elements to create a plasma plume from both liquid and solid sample material, an exhaust system, light gathering and transmitting elements (which can include fiber optics, lenses, mirrors and various other components described above), a spectrometer with a detector, computer software and/or firmware operable to perform real time data analysis, and various control loops operable to automate operations with no human interaction.

As shown in FIG. 14A, the portion of LIBS for liquid sample material analysis has a compact pump D10, preferably peristaltic pump, which delivers a liquid sample into a nebulizer D20 with a preselected flow rate depending on the characteristics of the liquid sample. The cycles of the peristaltic pump can be synchronized with the laser to optimize process efficiency. A pressurized carrier gas D30 flows into the nebulizer D20 where a portion of a liquid sample was aerosolized into a stream of fine and preferably uniform aerosol particles. The nebulizer can be pneumatic (cross-flow, concentric, Babington type, V-groove, parallel-path, flow-blurring, micro-flow or self-aspirating, etc.) and/ or ultrasonic. The pneumatic nebulizers require a flow of a carrier gas D30 which can be an inert gas such as nitrogen, argon and others. The self-aspirating pneumatic nebulizers do not require a peristaltic pump. The nebulizer can be pulsed, and the pulsed nebulizer can be synchronized with the laser used for LIBS analysis. Alternatively, any nozzle, electrospray, any other types of liquid aerosolizer, and/or a mist dispenser can be used to generate a stream of aerosol D45 with a preselected size distribution depending on the application. An illustrative embodiment shown in FIG. 14A includes a cyclonic spray chamber D40 that is used to remove large droplets produced occasionally by the nebulizer. A Scott double-pass type of a spray chamber can be used alternatively to remove large droplets from the aerosol steam. The unused portion of the aerosol stream can be suctioned away by a pump having air purification filters such as an activated carbon, HEPA, ASHRAE, any combination thereof, and/or others connected to a suction funnel D50 as shown in FIG. 14A. Unused liquid sample can be drawn off into a recycling or waste bottle.

A LIBS system for liquid or solid sample analysis can have a pulsed laser D110 shown in FIG. 14A having various power, pulse, wavelength characteristics in different embodiments. The laser can be a solid state Nd:YAG and/or an excimer gas laser. The laser pulse energy can range from tens microjoule to hundreds millijoule. The laser pulse repetition rate can change from single shot to several kilohertz. The laser can be a nanosecond or picosecond pulsed laser with a fixed spectral wavelength ranging from ultraviolet to near-infrared.

An example of a laser beam delivery scheme before reaching a solid phase sample site or a laser focal point in an analysis zone filled with flowing aerosol stream produced from a liquid phase sample is shown in FIG. 14A for LIBS analysis. The laser D110 in some embodiment can operate exclusively at a fundamental frequency or variable frequencies including a higher harmonic generator for operation on a multiplicative-integer frequency. Some embodiments can include an attenuator D120 to control laser power from 0% to 100%. Further embodiments can include two flat mirrors D130, D140 to effectuate a compact arrangement of the LIBS apparatus. Two flat mirrors D170, D180 can be installed at a fixed low angle of incidence that causes an input laser beam to undergo multiple reflections to produce a laser beam with an approximately Gaussian amplitude profile D60. A Gaussian beam profile is generally an optimal profile for generating plasma in an aerosol stream because it can be focused tightly and therefore can produce a highly energetic plasma. For example, a beam can enter a two flat mirror system such as D170 and D180 configured to reflect the laser beam 4 times at each mirror surface, before exiting the two-mirror system and reaching to a preselected position in an analysis zone D48 filled by flowing aerosol stream D45 generated from a portion of a liquid sample material.

A Gaussian-shaped laser beam D60 described above can be further focused by a lens D70 illustrated in FIG. 14A and/or a combination of lenses. One preferable embodiment has a combination of a plano-convex lens with a positive meniscus lens which directs the laser beam in a preselected position. A mirror or a mirror system is preferably used as a focusing element since it does not cause chromatic aberrations. Furthermore, using mirrors instead of lenses facilitates the full spectrum collection without significant losses of efficiency in the ultraviolet and near-infrared regions of a recorded spectrum. The laser beam is focused into the preselected laser focal point D47 in analysis zone D48 including a stream of sample aerosol D45 produced by nebulizer D20 and spray chamber D40. The optical emission generated by the laser-induced plasma is collected by a curved mirror D80, preferably a concave spherical mirror. Alternatively, a system of two off-axis parabolic mirrors, or an objective lens, a combination of lenses and/or mirrors can be used to collect optical emission generated by the plasma plume. The optical emission from a laser-induced plasma is focused into an optical fiber D90 which can be coupled to an optical spectrometer D100. Alternatively, an objective lens, a combination of lenses and/or mirrors can be used to deliver the optical emission into an optical spectrometer. The optical spectrometer is fitted with an optical detector. In one preferred embodiment the optical detector can be gated. The parameters of the laser pulses and the gating of the optical detector can be cooperatively optimized to effectuate high sensitivity and/or accuracy in the chemical analysis.

In further embodiments, a movable mirror D150 shown in FIG. 14B can direct a laser beam toward a beam homogenizer D160. Mirror D150 can be planer, concave, convex and/or parabolic depending on the applications. Mirror D150 can be rotated and/or translated to a preselected position. The beam homogenizer smooths the irregularities at the edge of a laser beam and creates a beam with a uniform energy profile. It can also be used to adjust the laser spot size at the sample surface. To generate a beam with a uniform energy, the beam homogenizer can transform an output laser beam into a far-field collimated beam using a circular cross-section of approximately uniform irradiance at the focal plane. The cross-section of uniform irradiance can be linear, square, or of any other geometric shape. A collimated beam is parallel rays of light therefore has relatively uniform intensity and/or energy profile and spreads minimally as it propagates. Collimated beam D190 with uniform intensity profile, also called as a flat-top or top-hat laser beam, can be directed to the surface of a solid sample located in a chamber. In some embodiments, additional flat mirrors can be installed to facilitate the steering of a beam within a compact arrangement of the instrument. This flat-top laser beam distribution is critical for precise and accurate chemical analysis of solid phase samples.

A collimated flat-top laser beam D190 with an adjustable circular cross-section is directed toward an optical objective D230 preferably an apochromatic objective with a long working distance and a minimum of aberrations. In various embodiments, a flat mirror D220 facilitates a compact physical arrangement of the instrument. In some embodiments the mirror D220 can be a dielectric coated mirror that is highly reflective on the laser wavelength but is transparent to all other light wavelengths. A laser beam can be focused on the surface of a solid sample D240 placed into a sample chamber D250. The sample chamber can have a transparent window, through which a collimated laser beam passes perpendicularly for sample ablation. The sample chamber can be installed on a precisely movable stage D260 coupled to x-y-z translation motors that are operable to move the sample chamber on the stage in x, y, z axes independently. The size of the translation stages can range from several tens to several hundred millimeters. The stage typically can move in each direction with linear resolution less than 1 micrometer. A sample chamber can have different configurations to secure the sample. It can be non-sealed, marginally sealed such as sealing with a rubber band, or rigorously sealed to allow the analysis of sensitive and/or hazardous materials (for example, Li-ion battery or radioactive materials) in an enclosed environment. A sample chamber may include a removable spacer D270 to analyze samples with very small dimensions conveniently. The spacer can be move back and forth to accommodate different sample dimensions. To optimize the analysis of various sample sizes further and reduce the amount of unused volume in the sample chamber, spacers in different sizes having corresponding sizes can be provided. The stage with the sample chamber can precisely move the sample in a predetermined pattern relative to the laser beam ablation spot, thereby systematically ablating the selected sites of the sample to obtain a composition map of the sample. The composition map can comprise an elemental analysis of one or more sample sites. Laser ablation of the solid sample surface removes a portion of material at a selected sample site and creates a depth of the ablation craters depending on the power of the laser. A serial ablation of the sample by refocusing the laser to the depth of the ablation crater effectuates a layer-by-layer analysis, thereby generating a 3D image of the sample chemical composition.

Characteristic spectral emission emanating from a LIBS plasma plume generated by ablation of solid phase sample material is collected at a low angle relative to the incident laser beam by an objective D280 and transmitted through an optical fiber cable D90 to an optical spectrometer D290. Optical spectrometer D290 and optical spectrometer D100 in FIG. 14A can be same or different. In some embodiments, two or more objectives D280 can be installed symmetrically in a circle around a laser beam objective D230. The later arrangement is particularly useful when an optical spectrometer D290 is a multi-channel configuration of several spectrometers. In one embodiment, each spectrometer channel can be coupled to its own optical objective D280. In further embodiments, at least a channel for ultraviolet light is coupled to a dedicated ultraviolet objective, and the other channels for visible to near infrared light are coupled to the second objective. Chromatic aberrations are substantially reduced in a configuration having multiple dedicated objectives. The laser beam focusing and light collection optics can include additional optical elements depending on the embodiments.

The laser breakdown beam is focused to a spot below the focusing objective D230 for solid sample analysis. Translation stage D260 can move a preselected sample site to the laser spot position to ablate material from the preselected sample site. The distance from the focusing objective D230 to the surface of sample D240 in chamber D250 can be measured using triangulation sensor D300 shown in FIG.

14A. Further, sample D240 in chamber D250 can be moved by stage D260 in a predetermined pattern precisely and automatically to generate a chemical image of the ablated area of a solid sample. One-, two-, or three-dimensional chemical image of a solid sample can be measured. In some embodiments flat mirror D310 and compact CMOS camera D320 provide magnified images of the sample surface for visual inspection and navigation.

Sample chamber D250 includes several miniature light emitting diodes D330, D340 for even and adjustable flood illumination of the sample. A sample chamber can have an inlet and outlet D350, D360 to admit and exhaust a flow of unreactive gas and/or air through the chamber. The unreactive gas can be an inert gas such as nitrogen, argon, or helium which can come from a cylinder D370. The flow rate of gas from the cylinder can be controlled using a mass flow controller D380. The choice of a carrier gas depends on the sample and element(s) planned to be measured. For example, an argon atmosphere facilitates optical excitation of metal and other atoms providing a stronger signal in LIBS measurements. On the other hand, a helium atmosphere facilitates optical excitation of halogen and other non-metal atoms. In an embodiment, a sample chamber can include also lights on the bottom of the chamber to illuminate transparent samples. In some embodiments, the temperature of a sample chamber can be adjusted depending on the characteristics of the sample. It can be heated using an electrical resistance heater and/or can be cooled using a refrigeration coupled to an exchanger, a thermoelectric cooler, and/or a phase change medium such as ice water to optimize the LIBS signal. Furthermore, the sample chamber can accommodate multiple samples at the same time which increases the efficiency of loading samples to the instrument.

Figure 14B:
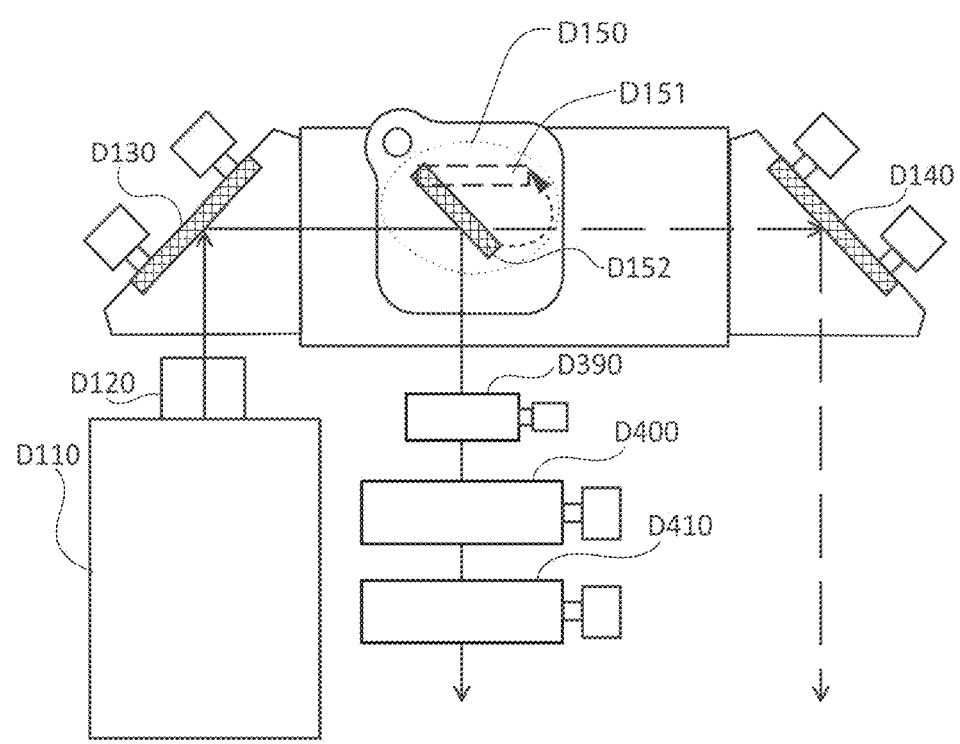
FIG. 14B is a simplified diagram showing optical elements in an embodiment for redirecting a laser beam from a liquid analysis configuration to a solid sample analysis configuration as depicted generally in FIG. 14A.

FIG. 14B is a simplified diagram of a portion of apparatus showing a beam emanating from a laser and optical elements to direct and/or focus the laser beam to form an emissive plasma from an aerosolized liquid sample or a solid sample, according to an embodiment. A pulsed laser D110 generates a laser beam that passes through an optical attenuator D120 toward a flat mirror D130. The flat mirror D130 reflects a laser beam perpendicularly toward a precisely movable mirror D150. When movable mirror D150 is in position D152, the laser beam can be reflected in an optical path including a negative lens D390. The negative lens D390 in cooperation with a positive lens D400 can expand the laser beam diameter. The expanded laser beam passes through diaphragm aperture D410. Aperture D410 is configured to pass only the central part of the laser beam having an approximately uniform radial intensity profile. The relatively uniform laser beam produced thereby is directed along an optical path to a solid sample chamber to produce a plasma plume for LIBS analysis. The size of a laser spot generated at a sample site can be in the range of 10 μm to 200 μm or sometimes even larger. In other position D151 of the movable mirror D150, the laser beam from a flat mirror D130 passes to another flat mirror D140 shown in FIGS. 14A and B The second flat mirror D140 reflects a laser beam perpendicularly toward a system of two flat mirrors D170, D180 as shown in FIG. 14A to produce a laser beam with an approximately Gaussian intensity profile. The laser beam with an approximately Gaussian intensity profile is directed toward liquid sample analysis.

The diagrams in FIGS. 14A and 14B are the illustrative examples showing various practical embodiments of the present disclosure. In various embodiments, a collimated flat-top laser beam, a Gaussian beam, and/or other laser beam profiles can be formed and used for analysis of different solid or liquid phase sample materials depending on the application. In a number of embodiments, different lasers types, optical elements, optical spectrometers, detectors, other components of the LIBS can be used interchangeably to optimize LIBS signals further.

In an embodiment, a compact pump can be used to introduce a portion of liquid sample into a nebulizer operable to aerosolize liquid sample material into a stream of carrier gas. The liquid sample aerosol flows through nozzle D41 emerging in aerosol stream region D45. Mirror D150 is moved into non-intercepting position D151 to allow laser pulses emanating from single laser D110 to follow an optical path D60 to a focal point D47 in analysis zone D48 within the flowing aerosol stream D45. The laser pulses produce an emissive plasma plume surrounding the focal point comprising liquid sample material. The optical spectrum emanating from the plasma plume generated by the laser ablation can be measured with a spectrometer. The liquid samples can be any aqueous and non-aqueous solutions including as waste water, beverages, urine, solvents, kerosene, gasoline, diesel, biofuels, mineral oil and crude petroleum samples, and others. Both univariate and multivariate calibrations can used to quantify the spectroscopic sample measurements using known reference standards.

The sensitivity of the LIBS analyses obtained using apparatus and methods disclosed herein met or exceeded American Society for Testing and Materials (ASTM) standard method D5185 for multi-element ICP-OES analysis of lubricating oils. In general lower limits of detection for the present methods and apparatus for elements tested were also found meet or exceed the requirements of ASTM standard method D5185 which is hereby incorporated by reference in its entirety (ASTM Volume 05.02 Petroleum Products, Liquid Fuels, and Lubricants (II): D4177-D6468, ASTM International, 2020).

Clean or used motor oil from a variety of vendors such as diesel fuels, PremiSolv solvent (odorless proxy to kerosene), and fuel additives (lubricants, boosters, inhibitors) were also analyzed using the LIBS apparatus and methods disclosed herein. The minor elements found in the petroleum products tested according to our liquid LIBS methods disclosed herein included Ca, Mg, V, and Na indicating that these products contaminated with particulate matter likely caused by metal wear. The small particulates were readily atomized, measured and quantified using the apparatus and methods based on LIBS. The limits of detection defined by tripled standard deviation in spectra of blank sample (3σ) for metallic contaminants were estimated to be around "single-digit" ppm (mg/kg). A person having ordinary skills in the art would appreciate that small particulates in a liquid sample may be insoluble and/or difficult to atomize using ICP plasma.

100 laser pulses with 10 Hz frequency were used in a typical trial to form luminous plume(s) for measuring each chemical element spectra with an analysis time of 10 sec. The spectra from the laser plumes were used to calculate the relative standard deviations of the measurements, to construct linear calibrations for each element, and to determine 3σ limits of detection and triple standard deviations of a blank sample. The results of these measurements are summarized in table in FIG. 15 that shows the detection limits of the elements tested using LIBS in argon and nitrogen flows and the lower limits of detection specified in the ASTM standard test method D5185 for ICP-OES analysis of lubricating oils. As shown in the table in FIG. 15, considerably smaller concentrations of most elements tested were detected using present LIBS apparatus embodiment in an argon flow as compared to those using the standard test method for ICP-OES. Furthermore, the detection limits using instant LIBS in a nitrogen flow also met or exceed for some elements (V, K, Na, Li, Fe, Mg) as compared to those performed in the argon flow tests.

The table in FIG. 15 shows the lower limits of detection of analyte trace elements tested using present LIBS methods and apparatus in different carrier gas and/or solvents in comparison to the limits of detection specified in the ASTM test method D5185 for ICP-OES analysis performed in tenfold diluted lubricating oils and nebulized by argon carrier gas. The limits of detection by present LIBS for aqueous solutions in argon flow shown the column 3 in the table obtained by LIBS instrument configured with a 6-channel spectrometer, and measuring broadband spectra from 1000 laser pulses on CCD detectors. Column 4 shows the limits of detection of the elements in Conostan base oil (a) directly nebulized in argon flow using LIBS instrument configured with a compact Czerny-Turner spectrometer and ICCD camera, and accumulating spectra from 100 laser pulses. Column 5 demonstrates the limits of detection in base oil (b) measured in the same configuration as Column 4 but using nitrogen flow as a carrier gas. Column 6 shows the limits of detection in base oil (c) measured in a similar configuration as Column 5 but using a compact Czerny-Turner spectrometer and ICCD camera from a different vendor. The latter configuration of present LIBS, the limits of detection for aqueous solutions nebulized in nitrogen flow that are order of magnitude lower than the records shown in Column 3.

Figure 16:
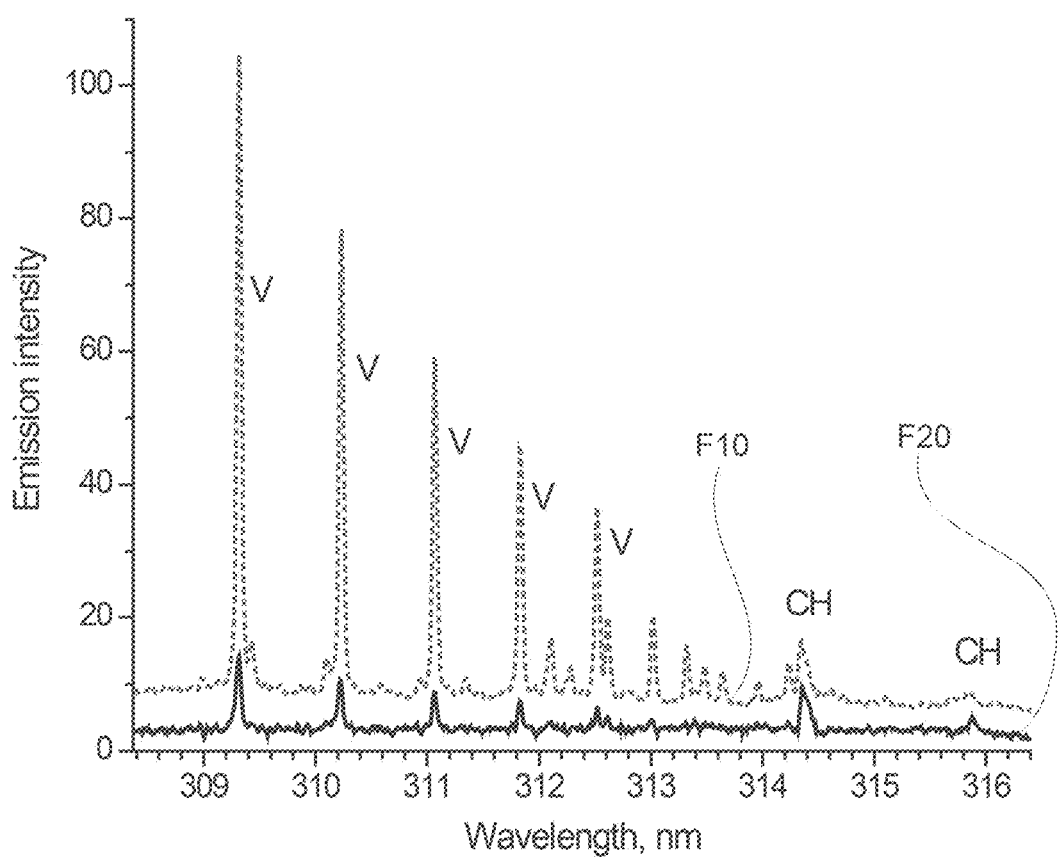
FIG. 16 shows spectra of high viscosity NIST reference materials RM-8505 and SRM-1634c in an embodiment.

The National Institute of Standards and Technology (NIST) reference materials such as Vanadium in Venezuelan Crude Oil (RM-8505) and Trace Elements in Fuel Oil 'No. 6' (SRM-1634c) were analyzed for traces of vanadium to evaluate the performance of instant LIBS apparatus and methods. Vanadium concentration in Venezuelan crude is specified to be about 390 ppm (mg/kg) and a certified mass fraction of vanadium in Fuel Oil 'No. 6' is only 28.19±0.40 ppm (mg/kg). NIST reference materials for both of these levels were successfully measured using a LIBS apparatus embodiment as shown in FIG. 16. The spectra of Venezuelan Crude Oil F10 and Trace Elements in Fuel Oil No. 6 F20 after background subtraction for the region of the most prominent ionic quintet of vanadium spectral lines are shown in FIG. 16. The most intense emission line in this quintet was observed at 309.31 nm. The background emission in this spectral interval comprises continuum bremsstrahlung radiation from plasma electrons and molecular transitions of free radicals OH and CH. The CH emission originates from the oil matrix but it does not directly interfere with the vanadium spectral lines. The OH emission originates from the water content in oil and humidity of the ambient air. The OH spectrum in this region has many partially-resolved rotational lines that should be subtracted or at least accounted as a possible interference.

The ability of a LIBS apparatus embodiment to perform multi-purpose analyses of all kinds of the petroleum-related liquid samples was demonstrated with especially good sensitivity for traces of metals. Optical emission from major, minor and trace elements in various samples was detected, measured and quantified. For example, metal signals from samples of Conostan base oil standards (kinematic viscosity 20 and 75 cm$^2$/s, cSt), mineral paraffin oil, Arabian, Azerbaijani, Texan and algae crude oils, lubricants, fresh and used motor oils were measured. Elemental quantification of the LIBS data was done with standard univariate calibration using an area under a spectral line contour fitted by Lorentzian profile.

Figure 17:
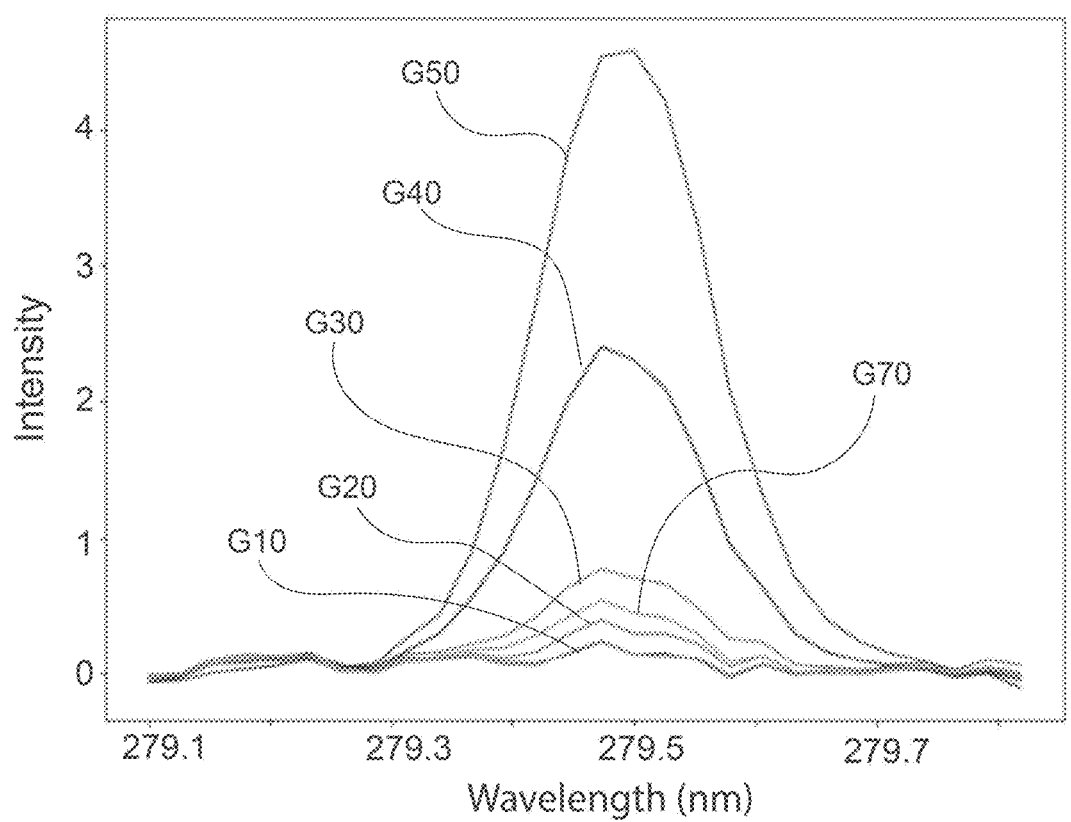
FIG. 17 shows LIBS spectra of Mg peak at 279.5 nm from a gasoline sample and various concentrations of Mg calibration standards in PremiSolV solvent.

To investigate the utility of LIBS ability for analyzing the lightest distillation fractions, the samples of methanol, ethanol, acetone, ortho-xylene, isopropanol, isooctane, gasoline, methyl isobutyl ketone, water and aqueous solutions were nebulized, ablated and the signals from the aerosolized samples were measured. For example, FIG. 17 shows the LIBS spectra of Mg ionic emission at 279.55 nm from the gasoline sample G70 and the calibration standards prepared using PremiSolv (Conostan, a Division of SCP SCIENCE) as a pure source with known concentrations of magnesium (0 ppm Mg G10, 0.05 ppm Mg G20, 0.1 ppm Mg G30, 0.5 ppm Mg G40, and 1 ppm Mg G50). The concentration of Mg in a gasoline sample obtained from a regular gas station was about 10-fold higher than the limit of detection of the LIBS instrument shown in FIG. 17.

The hydrogen-to-carbon (H/C) ratio is an important parameter for petroleum characterization since the quality of a petroleum cut (fraction) generally increases with the H/C ratio. The greater the H/C ratio, the greater the amount of energy that can be released when petroleum fuel undergoes combustion. The H/C ratios also correlate with the aromaticity indexes and specific gravity of hydrocarbons. A person having ordinary skills in the art would appreciate that these measurements cannot be performed using conventional inductively coupled plasma (ICP) or x-ray fluorescent (XRF) analysis in a single instrument and/or in combination.

Quantitative calibration for determination of the elemental H/C and 0/C ratios in solvents using the broadband LIBS spectra was successfully performed using the present LIBS methods.

Organic solvents namely ethanol, methanol, ortho-xylene, and their mixtures were chosen to investigate the ability of LIBS to measure the H/C ratio in liquid samples. These solvents have very different ratios: The H/C for methanol is 4 and the H/C for ortho-xylene is 1.25. The mixtures of methanol and ortho-xylene yield intermediate H/C ratios. An embodiment equipped with a compact 6-channel spectrometer having CCD detectors was used for rapid acquisition of the broadband spectra of these samples. Undiluted ortho-xylene samples exhibited the highest intensity of molecular emission from CN and C2 radicals since the ortho-xylene molecule has an aromatic ring with conjugated double bonds. A methanol molecule does not have double carbon bonds. Consistent with this, the LIBS spectrum of aspirated methanol exhibited only weak emission at the Swan bands of C2. The recorded spectra imply that the intensity of molecular emission of CN and C2 radicals can be associated with the molecular structure of an interrogated sample.

Figure 18:
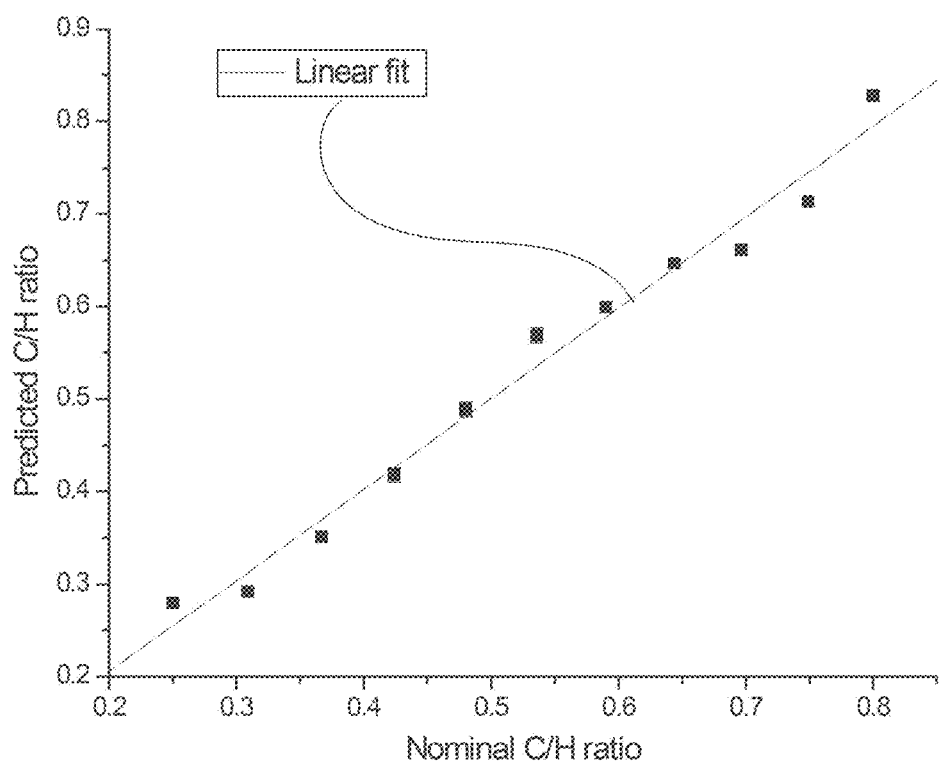
FIG. 18 shows a multivariate calibration graph using LIBS to determine the C/H ratio in organic solvents after an embodiment.

Quantitative calibration plots were constructed to determine the H/C ratio in solvents with the acquired broadband spectra. A person having ordinary skill in the art would appreciate that non-linearity of the calibration plots impeded determination of the H/C ratio. Such non-linearity problems was overcome using the entire broadband spectra (190-1000 nm) for multivariate calibration based on partial least squares regression. Using conventional instruments, it is difficult to acquire such broadband spectra. An exemplary multivariate partial least squares regression for calibration of the C/H ratio measurement using instant LIBS instrument is shown in FIG. 18.

Figure 19:
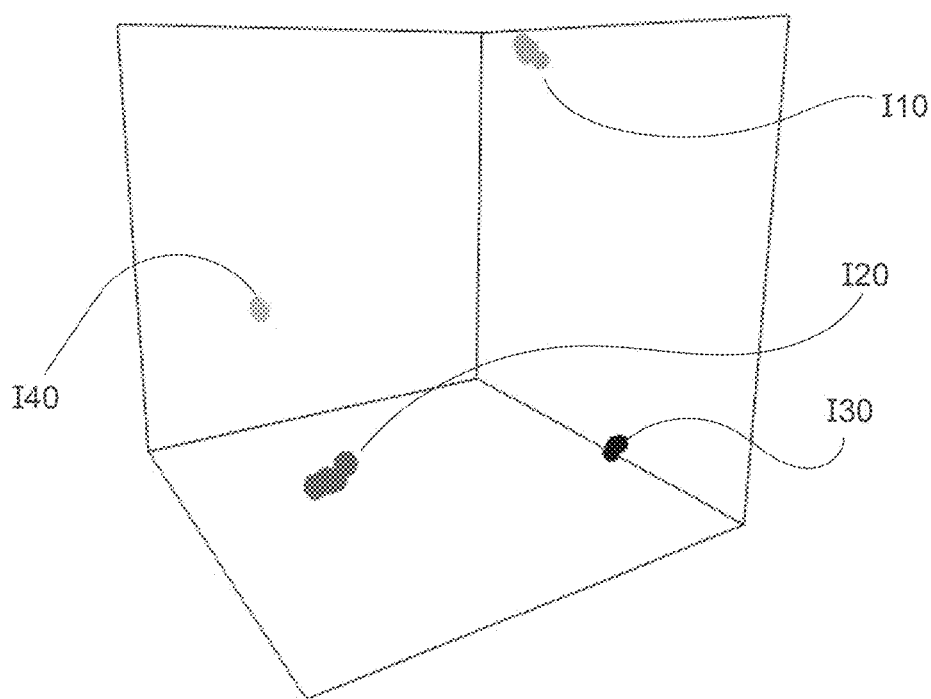
FIG. 19 shows an example principal component analysis of LIBS spectra.

Separation of an unknown samples requires laborious manual or semi-manual spectral examination using conventional techniques. On the other hand, unknown samples can be easily separated using instant LIBS embodiments. The chemometric data of the LIBS spectra were processed using principle component analysis (PCA). For example, FIG. 19 shows a clear separation of gasoline I40, ethanol I30, and two mineral oil samples (25 cSt I10 and 75 cSt I20) in principal component space after statistical analysis.

In various embodiments, principal component analysis (PCA) and partial least squares regression (PLSR) are embedded in the data analysis software in an embodiment, and operate cooperatively to effectuate simple statistical algorithms that provide quantitative analyses.

The argon flow was used to facilitate comparison between the performance of instant LIBS apparatus and methods and conventional ICP-OES analyses. The ICP technique uses an inductive plasma sustained in flowing argon. Another reason for using argon is that when laser ablation is performed in an argon atmosphere, relatively more intense emission is obtained compared to other common gas media. Nitrogen was also tested as a carrier gas for analysis of Conostan oil standards (NIST traceable) and various crude oil samples. The net emission signal in argon was higher than the signal in nitrogen, but the continuum background and noise in nitrogen were found to be lower than in argon. As a result, it was found that estimated detection limits for some elements in various embodiments were lower in nitrogen (offering better detectability) than those done using an argon flow. Compressed air was also tested as a carrier gas and was found to be compatible with various analyses. Although argon flow provided better detection limits for most elements, the compressed air flow, nonetheless, was found to result in better (lower) detection limits for the elements Al, K, Li and Na.

LIBS analysis using nitrogen gas or compressed air as a carrier gas provided a degree of detectability, sensitivity, and accuracy that improve upon ICP-OES using argon flow. Moreover, LIBS does not have the well-known limitations of ICP. For example, introduction of a substantial amount of liquid (especially organic) sample into the ICP analysis region may quench and extinguish the plasma. Furthermore, ICP is burdened by a loss of sensitivity when sample dilution is necessary to avoid extinguishing of plasma.

The spectra acquired from four motor oil samples of 10W30 grade made by Chevron, Shell, Valvoline and Mobil were processed using a partial least square (PLS) algorithm by taking into account the small differences in the intensities of major spectral features (O, N, H, CN, C2) and the substantial differences in trace constituents (additives, impurities) among the samples. Accurate discrimination between new and used motor oil was achieved with a high degree of confidence. This is due to a significant increase in metal emission originating from metallic contaminants, mostly particulates, in used oil. Thus, LIBS can improve the efficiency of monitoring oil and fuel quality as well as the extent of metal wear in vehicular systems and hydraulic equipment. The chemometric algorithms enabled correct identification and rapid classification of different oils and fuels without traditional elemental calibration.

Detection of halogens and trace metals in biofuel products is important to monitor clean combustion and to prevent corrosion of components when using these alternative fuel sources. Certain trace metals in plant-derived biomass are valuable to fermentation in biorefinery, but other trace metals are detrimental. The oxidizing metal ions have significant effects on the catalytic oxidation of biomass that can lead to depolymerization of the biomaterials such as starch, cellulose, and lignin.

Using an embodiment, choline emission at 837 nm in oil was measured using a helium stream at low pressure. The estimated detection limit was found to be 13 ppm. In various tests, the Cl spectral line was on top of an emission background determined by free-electron continuum (bremsstrahlung radiation) and molecular C2 bands. In helium flow, an emission contribution arising from excimer molecule He2 was also seen. Background emissions were normalized and subtracted using the blank oil sample as a reference. Various embodiments also used Lorentzian fitting and statistical noise rejection to reduce and/or remove background interferences.

Similar tests demonstrated the detection limit of 250 mg/kg (ppm) for the chlorine measurement in mineral oil using helium flow at atmospheric pressure. The detection limit for chlorine in water using helium flow at atmospheric pressure was 43 ppm. The ability to measure the chlorine content in water is important for analysis of produce and fracking water.

The leading cause of aviation fuel thermal stability failures is known to arise from contamination by metal traces. Modern aircraft turbine engines are vulnerable to fouling by contaminants in jet fuels (e.g., JP-5). This occurs because of thermal degradation and oxidation of the fuel at elevated temperatures (250-300° C.) in the engine. Fuel atomizers have been considered the most critical components because they have relatively small diameters, and are generally exposed to relatively highest temperatures. It is believed that dissolved oxygen in the fuel is quickly converted to organic naphthanates, and then to hydroperoxides which decompose to carbonaceous residue that tends to accumulate on the walls of orifices. The decomposition process can be catalytic. The catalysts for degradation are thought to be Cu and other trace elements such as Cd, Zn, Fe, Co, Ni and Pb.

Trace level Cu in aviation turbine fuel can significantly accelerate thermal instability of the fuel, leading to oxidation and production of detrimental insoluble deposits in the engine. Metals such as dissolved Cu can degrade the storage stability or thermal stability of the aviation turbine fuel by catalytic action. Cu is believed to be the most detrimental of these materials and the contamination can occur during distribution from the refinery to an airport. One source of contamination common to aircraft carriers is "admiralty metal" used as fittings on fuel hoses on most Navy ships. This material is approximately 70% Cu and 30% Zn. Contact with an admiralty metal fitting may cause fuel to be contaminated quickly at some level.

The thermal stability of aviation fuel is often measured by a laboratory device called a Jet Fuel Thermal Oxidation Test (JFTOT) analyzer. The method used is ASTM D3241 which is hereby incorporated by reference in its entirety (ASTM D3241-20a, Standard Test Method for Thermal Oxidation Stability of Aviation Turbine Fuels, ASTM International, West Conshohocken, Pa., 2020, www.astm.org) Fuel in this tester is heated to 260-275° C., passed through a stainless-steel filter and onto an aluminum tube. The test is run for 2 hours; the appearance of the aluminum tube is then evaluated for the pass/fail result. Only a slight darkening of the tube (0-2) is permitted for a pass. Greater darkening (3-4, Peacock and Abnormal) is considered to be failure. JFTOT tests on fuels containing known amounts of metals reveal that only 0.05 ppm of Cu will affect the test. Greater than 0.05 ppm Cu will likely result in a failure. Amounts exceeding 0.1 ppm of Cd, Zn, Fe, Co, Ni and Pb will also negatively affect the JFTOT result.

Necessity for real-time determination of the trace contaminants in fuels requires the development of an advanced portable analyzer with sub-ppm to ppb level sensitivity for Cu and other metals. The analyzer should perform rapid analysis of fuel as it is delivered to aircraft either shipboard or at an air field. Presently, Air Force fuel samples with suspected contamination are collected on site and then shipped to a fixed regional laboratory that performs the analysis by ICP-OES or ICP-MS. That process can typically take 2-10 days for results depending on site and international customs. During this transit and analysis time, fuel inventories and fuel servicing equipment are placed in a quality hold status, preventing the ability to support aircraft or ground vehicle generation and mission requirements. The multi-day turnaround delays the aircraft in its mission. In addition, the effect of admiralty metal aboard aircraft carriers may be overlooked entirely.

Aviation jet fuels (JP-5, JP-8), diesel and kerosene are all similar hydrocarbons. JP-5 is a hydrocarbon mixture of C9 to C16 with boiling range 156-293° C. The composition of JP-5 includes 53% paraffins, 31% cycloparaffins, 16% aromatics, and 0.5% olefins. It is essentially refined kerosene. Boiling temperature of JP-8 jet fuel ranges between 175 and 300° C. Diesel fuel consists of refined hydrocarbons, primarily 75% saturated alkanes, normal, iso- and cyclo-alkanes and 25% aromatics like naphthalenes and alkylbenzenes. It includes C10-C15 hydrocarbons having a boiling temperature range of 150 to 380° C.

The disclosed LIBS apparatus provided the following limits of detection in PremiSolv (a proxy for jet fuel) directly nebulized by a pneumatic nebulizer in argon flow using a compact Czerny-Turner spectrometer fitted with an ICCD camera and accumulating spectra from 100 laser pulses: Cu 0.07 mg/kg; Fe 2.4 mg/kg; Mg 0.01 mg/kg; Zn 0.6 mg/kg. These results demonstrated utility of the instant apparatus and methods for rapid analysis of aviation fuel that can be performed directly in the field.

There has been a long felt need for an advanced analytical measurement technology to meet the analytical requirements and provide real-time determination of the trace impurities in aviation and ground fuels. V, Ni, Fe, and Na are the major metallic constituents of crude oil that can propagate down to the final refined fuel product. Other metals can be introduced during production, transportation and storage, either in diluted or micro/nano-particulate forms. The real-time detection of these metals at a sub-ppm level is critical to ensure high quality of defense logistics fuels. An analytical technology that can be instantly applied anyplace on-site is key to the efficient fuel quality surveillance program. However, such analytical technology has not existed before the present embodiments and methods.

Pulsed laser ablation does not introduce any risk of fuel ignition because the fuel aerosol micro-droplets are instantly atomized and there are no combustion reactions. Operation in a nitrogen flow avoid the presence of any oxidant that can support combustion. Currently, commercial benchtop LIBS instruments designed for solid samples provide detection limits at levels of low to sub-ppm for most metals, and low ppb for some of them (comparable to ICP-OES). Ultrasonic nebulizers in some present embodiments are operable to produce an aerosol approximately 10 times denser than conventional ICP nebulizers, they can accordingly provide 10 times lower detection limits.

An ultrasonic nebulizer cannot be directly used to inject a dense liquid aerosol for analysis in ICP-OES or ICP-MS because the plasma would be extinguished by the very high sample load supplied by such nebulizers. Thus, a desolvation system would be required between the nebulizer and the plasma to effectuate analysis in this matter. This is an inherent limitation of an inductively coupled plasma source regardless of whether an aqueous solution or organic material such as jet fuel is the subject of analysis. By contrast the apparatus and methods of using instant LIBS for analysis of liquid samples, does not suffer from this limitation because the LIBS laser directly excites emission via excitation and ionization brought about by laser ablation.

Accordingly, LIBS in combination with ultrasonic nebulization function cooperatively to provide a method of elemental liquid analysis that has not been possible with prior art methods and apparatus. An ultrasonic nebulizer can be based on using a crystal transducer to impart energy operable to break up a liquid sample into fine droplets. The transducer without the desolvation apparatus can be miniaturized. It can be seen that the disclosed combination of a nebulizer and LIBS will be operable to achieve at least sub-ppm to ppb level detection limits for most metals in a liquid medium. Moreover, an ultrasonic nebulizer having no desolvator can retain even volatile elements (e.g. Hg), which would otherwise be depleted or totally lost during desolvator processing.

A series of tests using aqueous solutions and light solvents confirmed that the LIBS apparatus embodiments were useful to analyze any liquid sample having low enough viscosity for direct nebulization.

Chemical analysis of jet fuel using instant LIBS with direct nebulization is feasible. Owing to the fact that jet fuel is ordinarily clean and free from large particles (>0.5 μm) and is neither too volatile nor too viscous for direct nebulization. Similarly, the properties of diesel fuel are also compatible with the direct nebulization in combination with LIBS. Both fuels were easily converted into a dense aerosol using an ultrasonic nebulizer. This dense aerosol was effectively excited by a LIBS laser thereby facilitating ultra-sensitive trace analysis.

Several low-viscosity nutrient liquid samples used in the food industry were analyzed using the disclosed methods in an embodiment. An instrument configuration having a compact 6-channel spectrometer and CCD detectors was used to perform rapid acquisition of broadband spectra emitted from a luminous LIBS plume. A multivariate partial least squares regression was applied for quantitative calibration of the LIBS spectra. For comparison, concentrations of Mg in these samples was also measured using conventional ICP-OES. The results of LIBS and ICP-OES measurements from 5 different samples of nutrient liquid are shown in FIG. 20. The measured values of Mg concentrations by both techniques are in good agreement.

An embodiment of the disclosed LIBS methods and apparatus combines and integrates a liquid analysis module and a solid analysis module in one instrument. A software-controlled mechanism operable to move a mirror was used to switch the ablation laser beam between the modules, for analysis of a liquid or solid sample as required. This design is modular and can be customized to satisfy various different needs and requirements. Some end users may prefer a lower cost embodiment having relatively fewer functions. There are embodiments of the disclosed apparatus configured to be portable, yet they allow quantitative analysis of metals without compromising sensitivity at the low ppm or sub-ppm ranges.

Another aspect relates to the LIBS described herein includes the capability to quantify the 3-dimensional (3D) elemental composition of any solid phase samples in high spatial and temporal resolution. Solid samples such as multilayered, coated, composite, granulated, other forms of structured materials and/or material structures can be mapped and profiled chemically in x, y and z axes using LIBS. These types of 3D chemical analyses are useful for new battery design structures, learning lithium-ion transfer cycling mechanisms, impurity detection, quality control, evaluation of distribution and structural changes due to aging of devices.

In some embodiments, the elemental composition of thin-film structures found in photovoltaic, electronic devices, and solar cell structures can be analyzed using the 3D chemical imaging methods of LIBS to assess quality and/or state of a product. In another embodiment, instant LIBS 3D mapping and profiling methods can be used to analyze the binder and conductive agent distributions, a critical parameter of a battery performance, in Li-ion batteries and/or similar types of batteries. Any inhomogeneity in the binder and conductive agent distribution affects electrical performance of a battery adversely and may cause reduced battery performance.

3D elemental imaging can be essential for the analysis of spent catalysts to inspect how and when contaminants attach to a catalyst surface in a battery. In some embodiments, 3D elemental distributions of catalyst materials in batteries can be measured using present LIBS 3D chemical imaging apparatus and methods to assess the battery performance as these catalyst materials are good indicators of the activity and performance of a catalytic process. In some embodiments, 3D chemical mapping of a catalyst surface and depth profiling overtime can be useful to monitor to understand how contaminant elements adhere, bond and penetrate into the catalyst volume. In further embodiments, the chemical characterization of individual particles and grains of minerals provides information related to the composition, location of inclusions, mineral phases, and mineralogical distribution of elements. The disclosed LIBS instrument and methods herein allow users to spatially analyze solid samples for all major, minor, and trace elements including the lighter, organic, and halogen elements (e.g. H, Li, Be, B, C, O, N, F, and Cl) that are difficult or impossible to detect by conventional techniques.

Generally, a relatively high fraction of alumina and silica in typical catalyst materials used by petroleum refineries makes them difficult to dissolve in acids or aqua regia as necessary for traditional ICP analysis. Digestion of catalysts often requires hydrofluoric (HF) acid, which is dangerous, expensive and generates hazardous waste. The chemical mapping of the catalyst surface and depth profiling are important for monitoring how the impurity metals (e.g. Al, Ni, Fe, V, Cu, and Ti) adhere, bond and penetrate into the catalyst volume. A reconstructed elemental image of a spent catalyst sample demonstrated significantly elevated concentrations of nickel at and close to the surface. The concentration of Ni dropped with depth in a profile going into the bulk sample.

Figure 21A:
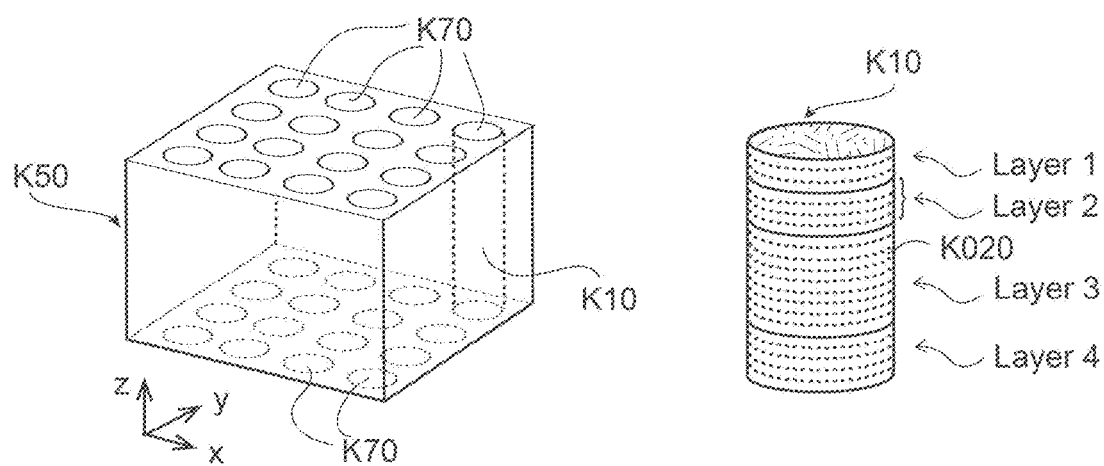
FIG. 21A illustrates sample sites in profiling various layers of a 3-dimensional solid battery cell structure.
Figure 21B:
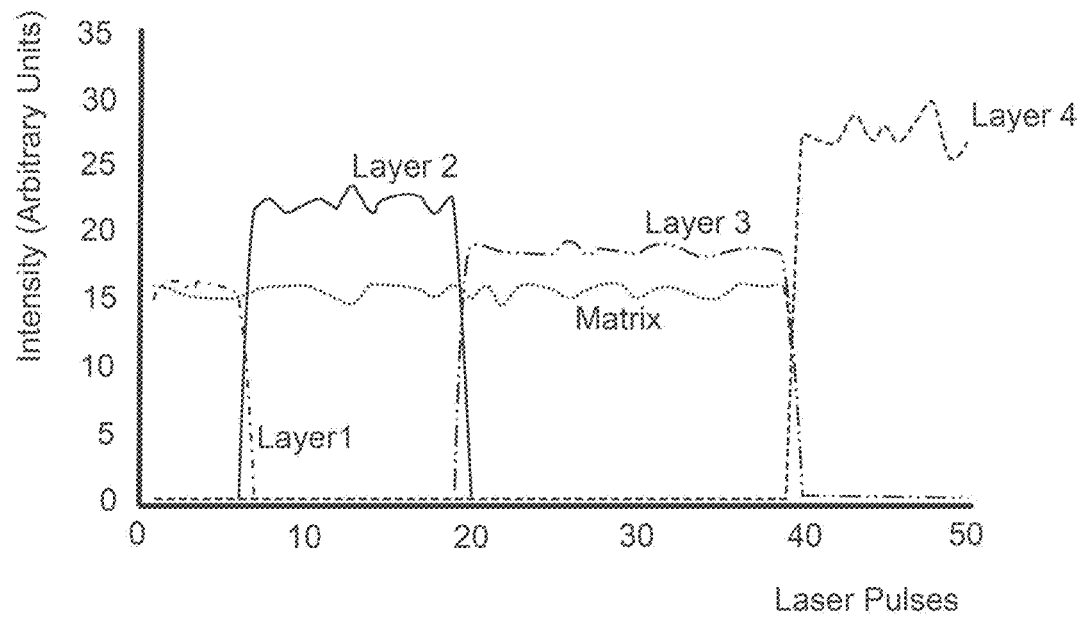
FIG. 21B shows the spectral intensities from various layers in FIG. 21A.

In an exemplary embodiment for 3D solid sample analysis of instant LIBS, each component in a cell in an Li-ion battery structure can be mapped and depth profiled to generate a 3D chemical imaging and to assess the quality of each component in a cell rapidly. FIG. 21A shows a typical cell structure K10 in a Li-ion battery K50 and a 3D chemical analysis procedure using instant LIBS. The cell structure K10 includes chemically distinct layers such as layer 1, layer 2, layer 3, and layer 4. A 3D chemical image of a solid sample can be generated by repeating the profiling procedure in a grid of preselected x and y map locations K70. Laser pulses are directed repeatedly into a preselected planar coordinate location in x, y, z directions until a substrate and/or a bottom of the analyzed structure is reached. Each laser pulse ablates a consecutive volume of sample material K20, and thus penetrates deeper into the sample structure. Each laser pulse generates an optical spectrum that characterizes that portion of the sample ablated by a single laser pulse. FIG. 21B shows the spectral intensities corresponding to layer 1, layer 2, layer 3, and layer 4 of cell structure K10 in a Li-ion battery. The depth profiling resolution of laser ablation was found to typically be in the range of 10 to 100 nm depending on the sample material. Minimum lateral resolution can typically be as low as 10 µm. Although in practice lateral resolution is often more than 10 µm it also depends on sample material. Generally hard materials characteristically support the best spatial resolution. Depth profiles can be performed on structures with more than 100 µm thickness with less than 1 µm depth resolution.

Also, measuring 3D chemical distributions can be useful for posterior analysis of human biominerals, gallstones, kidney stones, bladder stones, sialoliths, teeth, fingernails, bones, malignant skin, and other biological tissues. The disclosed LIBS profiling apparatus and methods can be also beneficial for microbiological, animal and plant studies, particularly for measuring distributions in contaminated or doped plant leaves. LIBS enables 3D elemental imaging at microscopic spatial resolution of entire organs especially after administering metal-based nanoparticles. The disclosed LIBS apparatus is important for environmental forensics, geological studies, analyzing drilling cores, shale exploration, and many other fields.

Another aspect for solid sample analysis provides a method of the 2D- and 3D-elemental imaging of individual minerals and mineralogical distribution of elements in geological samples. Practitioners in the field will appreciate high sensitivity of LIBS to spatially analyze lighter elements with atomic numbers Z<10 (e.g. H, Li, Be, B, C, O, N, and F) that can be present in high abundance in natural minerals. These elements can be the main constituents of minerals, e.g. Li and F that are often found in some micas. The lighter elements are missing from the analysis by conventional techniques due to lack of sensitivity and failure to detect. LIBS allows for in situ analysis of small mineral grains and inclusions. The analysis of water or gas inclusions in minerals and rocks is also possible using LIBS.

Figures 22A, 22B, 22C:
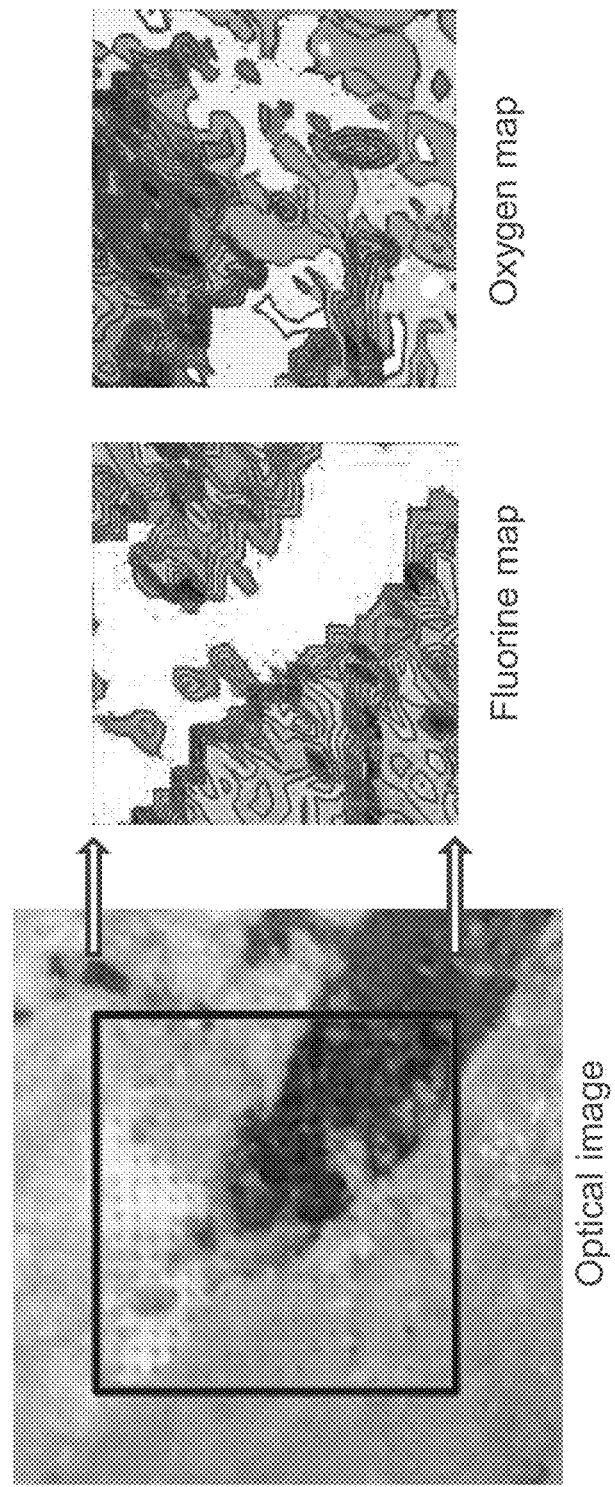
FIG. 22A is an image of a mineral sample and a mapped area according to an embodiment.
FIG. 22B shows a distribution of fluorene in the mapped area of FIG. 22A.
FIG. 22C shows a distribution of oxygen in the mapped area of FIG. 22A.

In one embodiment for exemplary demonstration, LIBS can be used as a means for detecting fluorine and oxygen in a mineral sample containing distinct regions of bastnasite (carbo-fluoride) and barite ($BaSO_4$). The sample was analyzed and the elemental composition over an area of interest was mapped using contour plots. FIG. 22A-C illustrate the results of 2D elemental profile of the bastnasite-barite sample using instant LIBS. Low concentrations of elements are represented by white color and higher concentrations are represented by darker shades in FIGS. 22B and 22C. 2D elemental imaging analysis of the mineral by present LIBS shows different 2D distribution patterns of fluorine (see FIG. 22B) and oxygen (see FIG. 22C) in the mapped area of the mineral sample.

In another example of elemental mapping for ruby-in-zoisite gem rock, LIBS revealed the distribution of elements such as H, O, Li, K, Na, and Mg that are difficult or impossible to detect using conventional techniques. Instant LIBS was effective in identifying main ruby and zoisite crystals as well as other constituent minerals within the analyzed area. Spatially resolved chemical information provides valuable insight on mineral phases present, location of inclusions, mineral distribution of elements harmful to downstream product extraction, and overall content of the target minerals. An embodiment of the disclosed LIBS apparatus allows geochemists to measure the content and distribution of elements that remained elusive in the past. LIBS analysis can improve decisions about processing mineral products.

The present disclosure also includes analysis of individual solid particles on a substrate such as filter paper, swipes, or double-sided adhesive tape. The advantage of the disclosure is that LIBS can measure elemental composition of the particles which are significantly smaller than a laser spot size on the sample site. Analysis of particles with sub-micron sizes and sub-nanogram masses is possible according to an embodiment of instant LIBS apparatus. Using instant LIBS method, chemical analysis of toxic, radioactive, or other particles on specimen surfaces can be done easily. Furthermore, analysis of individual solid particles embedded in ice or other matrices and/or detection and quantification of nanoparticles-based biomarkers and labels administered to tissues are also feasible. Similarly, the sensitive analysis of micro-particles is necessary in forensics and safeguarding against illicit manufacture of nuclear materials.

In an exemplary trial with a Peltier cooled chamber, polar ice-core samples were analyzed for determining paleoclimate proxy indicators such as particles containing Ca, K, Mg, Na, and other metals. Earlier analysis of these ice samples by ICP-MS established average elemental concentrations of parts-per-trillion (ppt). A LIBS embodiment effectuated visual navigation through a magnified image of the ice samples to enact relevant movement of x-y-z stages to place a particle into a spot where a laser beam would impinge. A single laser pulse obliterated the whole particle, revealing a spectrum and therefore composition of each individual particle. High spatial precision of LIBS allowed narrowing the age interval (<0.5 years) to see abrupt paleoclimate change events. Such high sensitivity is unattainable by ICP-OES, XRF and/or similar techniques. Only average concentrations in a ppt range can be measured by ICP-MS. Other applications include rapid metallurgical analysis and identification of individual debris particles collected on filters from aviation fuel and/or used motor oil. Debris alloy identification facilitates assessment of the degree of possible damage in engine components.

Repeatability of the LIBS measurements was tested using aerosolized samples of organic solvents and mineral oil with 100 ppm vanadium traces. The relative standard deviation of the vanadium line intensity was 1.45% over 12 sets of measurements with 20 accumulated spectra each. Experiments with bulk analysis of solid samples demonstrated that signal averaging over multiple ablation pulses improves the precision of measurements. Analysis by the disclosed LIBS apparatus of a thin glassy film deposited on silicon wafers that represent solid homogeneous samples resulted in relative standard errors from 0.3 to 0.5% of the average LIBS intensity over 100 laser pulses. By contrast, inhomogeneous mineral samples of boron ore that were powdered, homogenized and pelletized were then analyzed by LIBS using 1360 laser pulses accumulated into 20 spectra per sample. A resulting average relative standard deviation was 1.2% among 15 samples. These trials demonstrated that the averaged LIBS measurements had acceptable precision even when the samples were inherently inhomogeneous. This is of particular importance because a person having ordinary skill in the art would appreciate that boron is difficult to measure by other techniques.

An automated version of the LIBS instruments is developed for factory shift workers or technicians with no experience performing LIBS analysis and/or quantitative chemistry. The "Axiom" software platform prompts the technician at every step of the data collection process, i.e., loading the samples, ensuring the sample focus, placing pre-loaded experimental methods in the proper locations, and saving the data. The data saved by the user is processed by an automated version of the "Clarity" data analysis software. This automated software can create calibration curves, process unknowns for quantitative treatment, and export data in the form of a tab-delimited text file. Qualitative data may also be exported in the form of depth profiles and map figures. The "Clarity" software platform can be programmed to perform traditional univariate calibration via integration of predetermined elemental emission lines or to perform multivariate calibration via historical data libraries.

The operations of the disclosed apparatus and methods are executed using a various software embedded in the instrument comprising advanced chemometric algorithms, multivariate regression models, and data acquisition. All data is acquired by the Axiom platform and is automatically uploaded into "Clarity". The Clarity data analysis software offers a full suite of data analysis tools for rapid processing of LIBS spectra. The software provides rapid analysis of large arrays of spatially-resolved LIBS data (e.g. 2D and 3D chemical imaging data). The depth profiling for 3D chemical imaging is facilitated by a real-time DepthTracker module. In various embodiments, background subtraction, signal smoothing; normalizing; averaging, obtaining intensities and standard deviations are also operable functions of this embedded software. This software also provides automatic identification of spectral lines, integration of their peak areas either directly or using Lorentzian and Gaussian fitting of the line contours, and deconvolving partially overlapped spectral line contours. The software also comprises an algorithm operable to predict spectral peak intensities and plasma temperature based on a local thermodynamic equilibrium (LTE) plasma model. Calibration can be performed using techniques based on univariate and multivariate regression models, in single or in combination. Relevant spectral reference databases can be custom-built using a reference library creator module.

The software can also be programmed to upload the results to a database automatically. This technology allows a sophisticated chemical analysis to be performed by shift workers in a factory setting without supervision. These advances facilitate fast analysis of solid samples with full automation of the data collection, reduction (based on a combination of univariate and multivariate models) and reporting that enables quick decision about production and processing of materials.

The majority of the software functions are designed for analysis of solid samples. A special part of the operating software is dedicated to the analysis of liquid samples. The "Clarity" data analysis software is common for both liquid and solid samples.

In the foregoing specification, various aspects are described with reference to specific embodiments, but those skilled in the art will recognize that further aspects are not limited thereto. Various features and aspects described above may be used individually or jointly. Other aspects of the invention, including alternatives, modifications, permutations and equivalents of the embodiments described herein, will be apparent to those skilled in the art from consideration of the specification, study of the drawings, and practice of the various aspects. Further, various aspects can be utilized in any number of environments and applications beyond those described herein without departing from the broader spirit and scope of the description. The written description and accompanying drawings are, accordingly, to be regarded as illustrative rather than restrictive.

Although various embodiments have been presented and explained using simplified examples, it will be understood that various changes and modifications are possible with regard to materials, shapes, and dimensions, without departure from the scope of the patent claims. The embodiments and preferred features described above should be considered exemplary, with the invention being defined by the appended claims, which therefore include all such alternatives, modifications, permutations and equivalents as fall within the true spirit and scope of the present disclosure.

What is claimed is:

1. An apparatus for ablation spectroscopy, comprising:
   a pulsed laser configured to ablate material from a sample into an emissive plasma plume with a laser pulse;
   a plurality of spectrometers, each having a wavelength separating element and a detector; and
   a branched fiber optic lightguide having an entire bundle of optical fibers in a trunk section of the fiber optic lightguide adjoining a light receiving end of the trunk configured to collect light originating from the emissive plasma plume, the entire bundle of optical fibers in the trunk section being subdivided into a plurality of branches, each branch comprising a respective exclusive subset of the entire bundle of optical fibers, whereby each optical fiber in the exclusive subset of the entire bundle in a branch runs from the light receiving trunk end of the branched fiber optic lightguide to a terminal end of said branch;
   wherein:
   a terminal end of a first branch of a branched fiber optic lightguide is configured to emit a first portion of the collected light into a first spectrometer, and a terminal end of a second branch of the branched fiber optic lightguide is configured to emit a second portion of the collected light into a second spectrometer; and
   the computer is configured to receive spectral data comprising first spectral data from the first spectrometer and second spectral data from the second spectrometer, and the computer includes tangible media comprising instructions and data operable to determine a representation of the sample composition based on the spectral data.

2. The apparatus of claim 1 wherein each of the optical fibers in the entire bundle of optical fibers in the trunk section of the branched fiber optic lightguide has a same diameter.

3. The apparatus of claim 2 wherein the number of optical fibers in the first branch of the branched fiber optic lightguide is larger than the number of optical fibers in the second branch of the branched fiber optic lightguide whereby the emitted first portion of the collected light is greater than the emitted second portion of the collected light.

4. The apparatus of claim 1 further comprising an unbranched fiber optic lightguide having two ends consisting of a light receiving end configured to collect light originating from the emissive plasma plume and a terminal end configured to emit collected light into a third spectrometer, wherein an entire bundle of optical fibers runs from the light receiving end of the unbranched fiber optic lightguide to the terminal end of the unbranched fiber optic lightguide, and the spectral data received by the computer further comprises spectral data from the third spectrometer.

5. The apparatus of claim 4 wherein each optical fiber within the unbranched and the branched optical fiber lightguides has an equal diameter.

6. The apparatus of claim 5 wherein the radiant flux of light emitted from the terminal end of the unbranched fiber optic lightguide is greater than the radiant flux of light emitted from the terminal end of the first branch or the radiant flux of light emitted from terminal end of the second branch of the branched fiber optic lightguide.

7. The apparatus of claim 4 wherein the third spectrometer has a Czerny-Turner wavelength separating element.

8. The apparatus of claim 4 wherein the third spectrometer has a Czerny-Turner wavelength separating element and an ICCD detector.

9. The apparatus of claim 4 wherein the third spectrometer has a higher resolution and narrower spectral range than any other spectrometer selected from among the plurality of spectrometers.

10. The apparatus of claim 4 wherein the first spectrometer is a relatively broadband spectrometer and the second spectrometer is a relatively narrowband spectrometer.

11. The apparatus of claim 4 wherein the first spectrometer has a detector selected from the group consisting of a CMOS detector and a CCD detector.

12. The apparatus of claim 11 wherein the second spectrometer has a Czerny-Turner wavelength separating element.

13. The apparatus of claim 12 wherein the second spectrometer has an ICCD detector.

14. The apparatus of claim 4 comprising an array of spectrometers having respective Czerny-Turner wavelength separating elements, wherein each spectrometer of the array is configured to cover a different preselected wavelength region and the array of spectrometers is configured to capture a broad range of wavelengths at one time.

15. The apparatus of claim 4 further comprising:
    an inductively coupled plasma mass spectrometer operable to determine ion mass to charge ratios and ion mass to charge peak intensity values from a portion of the ablated sample site material;
    an enclosure configured to enclose the sample during the pulsed laser ablation;
    a flow channel connecting the enclosure to an inductively coupled mass spectrometer; and
    a gas flow system configured to provide a flow of unreactive carrier gas to the enclosure wherein the portion of the laser pulse ablated sample site material is transported through the flow channel to the inductively coupled mass spectrometer;
    wherein the computer is further configured to receive the ion mass to charge ratio peak intensity values from the inductively coupled plasma mass spectrometer, and the tangible media comprises instructions and data operable to determine the selected sample site composition based on the spectral data and the normalized ion mass to charge ratio peak intensity values.

16. The apparatus of claim 15 wherein the data and instructions are operable for the computer to detect a pulse-to-pulse variation in an amount of material ablated from a selected sample site by a laser pulse based on a signal level obtained from the spectral data; normalize ion mass to charge ratio peak intensity values for the pulse-to-pulse variation in the amount of material ablated from the sample using the signal level; and determine the selected sample site composition based on the spectral data and the normalized ion mass to charge ratio peak intensity values.

* * * * *